(12) United States Patent
Bauer

(10) Patent No.: US 8,770,309 B2
(45) Date of Patent: Jul. 8, 2014

(54) WIDE SWATH FOLDING TOOL BAR ASSEMBLY

(75) Inventor: Mark A. Bauer, Faribault, MN (US)

(73) Assignee: Environmental Tillage Systems, Inc., Faribault, MN (US)

(*) Notice: Subject to any disclaimer, the term of this patent is extended or adjusted under 35 U.S.C. 154(b) by 409 days.

(21) Appl. No.: 13/305,719

(22) Filed: Nov. 28, 2011

(65) Prior Publication Data

US 2012/0298388 A1 Nov. 29, 2012

Related U.S. Application Data

(60) Provisional application No. 61/417,729, filed on Nov. 29, 2010.

(51) Int. Cl.
- *A01B 49/00* (2006.01)
- *A01B 73/00* (2006.01)
- *A01B 73/06* (2006.01)

(52) U.S. Cl.
CPC .................................. *A01B 73/065* (2013.01)
USPC ............................... 172/311; 56/228; 111/57

(58) Field of Classification Search
USPC ......... 56/228, 377, 378; 172/311; 111/53–56, 111/59–61, 69
See application file for complete search history.

(56) References Cited

U.S. PATENT DOCUMENTS

| | | | |
|---|---|---|---|
| 3,491,836 A | 1/1970 | Doepker | |
| 3,620,550 A | 11/1971 | Hornung | |
| 3,961,469 A * | 6/1976 | McRobert | 56/328.1 |
| 4,171,726 A | 10/1979 | Ward | |
| 4,355,689 A * | 10/1982 | Friggstad | 172/311 |
| 4,896,732 A * | 1/1990 | Stark | 172/311 |
| 5,839,516 A | 11/1998 | Arnold et al. | |
| 6,220,366 B1 | 4/2001 | Noonan et al. | |
| 6,415,873 B1 | 7/2002 | Hudgins | |
| 7,364,096 B1 | 4/2008 | Sosnowski | |
| 7,497,269 B2 | 3/2009 | Jagow | |
| 8,342,256 B2 * | 1/2013 | Adams et al. | 172/311 |
| 8,601,781 B2 * | 12/2013 | Steenhoek et al. | 56/375 |
| 2005/0087350 A1 | 4/2005 | Bauer | |

* cited by examiner

*Primary Examiner* — Alicia Torres
(74) *Attorney, Agent, or Firm* — James W. Miller

(57) ABSTRACT

A tool bar assembly comprises a central section having a pair of pivotal wings each of which comprises pivotal inner and outer wing sections. The sections can be folded into a transport/storage position or unfolded into a substantially horizontal deployed position. In the deployed position, the sections are aligned end-to-end laterally behind a rear end of a movable frame which mounts central section. In the transport/storage position, the central section still extends laterally behind the rear end of the frame, but the pivotal wings have been folded forwardly at the ends of the central section to lie along opposite sides of the movable frame. In each folded pivotal wing, the inner wing section extends forwardly and upwardly at an angle from the central section and the outer wing section extends substantially rearwardly and horizontally from a front end of the inner wing section.

13 Claims, 22 Drawing Sheets

WIDE SWATH FOLDING TOOL BAR ASSEMBLY

CROSS REFERENCE TO RELATED APPLICATIONS

This application claims the benefit of previously filed provisional Application Ser. No. 61/417,729, filed Nov. 29, 2010.

TECHNICAL FIELD

This invention relates to farm implements for use in agricultural operations such as tilling, planting, fertilizing and the like. More particularly, this invention relates to a wide tool bar assembly, e.g. a 60 foot tool bar assembly, that is able to conduct such agricultural operations over a wide swath during a single pass of the farm implement over a farm field.

BACKGROUND OF THE INVENTION

In many agricultural operations, such as tilling, planting, fertilizing and the like, it is common to use a tractor or a separate tow frame connected to a tractor to tow a tool bar assembly over the surface of the farm field. The tool bar assembly is elongated and extends from side-to-side in a lateral or transverse direction behind the tractor or tow frame. A plurality of agricultural tools that perform some type of agricultural operation on the ground are carried on the tool bar assembly and are spaced apart across the width of the tool bar assembly. For example, when tilling soil, the tools comprise blades, rotary coulters and other known devices that break up the soil in preparation for planting. As the tractor or tow frame is propelled forwardly over the farm field in a forward direction, the tools carried on the tool bar assembly act in a wide swath dependent upon the width of the tool bar assembly and how many tools are carried on the tool bar assembly. In a soil tilling operation, the type and spacing of the tools carried on the tool bar assembly determines whether the soil is being tilled in a zone tillage method in which untilled strips are left in the swath or whether the entire swath is being tilled from side to side without leaving any untilled strips in the swath.

To enhance productivity, some tool bar assemblies are very wide. For example, a tool bar assembly having a 60 foot width would be considered a wide tool bar assembly. Thus, as the tractor makes a single pass over the farm field, the soil can be tilled, or the crop can be planted, or the ground can be fertilized, over a 60 foot swath. Thus, the farm field can be worked more quickly than if a tool bar assembly having only a 30 foot width is used. The tractor or tow frame need make only half as many passes over the farm field using a 60 foot tool bar assembly as opposed to a 30 foot tool bar assembly. This saves the farmer considerable time and expense.

While very wide tool bar assemblies are desirable from a productivity standpoint, they present various problems. Such tool bar assemblies have to be made in multiple sections that can be folded up. This is needed to reduce the width of the tool bar assembly to something that is not a great deal wider than the width of the tractor to allow the tractor and the trailing tool bar assembly to be transported on a road and for compact storage of the tool bar assembly. However, it can be difficult to fold a wide tool bar assembly into a compact form without having the folded tool bar assembly extend unduly high in a vertical direction, thereby posing height clearance issues, or unduly long in a fore and aft longitudinal direction in which the tool bar assembly may extend along the entire front to back length of the tractor, thereby making operator access to the cab of the tractor more difficult or blocking the vision of the operator to the sides of the tractor.

In addition, with a wide tool bar assembly having pivotal wings that fold up, the weight of the wings must be adequately supported when the tool bar assembly is both unfolded and folded. This is often done by using long support arms or stringers that extend out between the pivotal wings and a central portion of the tool bar assembly or some portion of the frame on which the central portion is carried. However, the need for such stringers only complicates the task of folding and unfolding the tool bar assembly as such stringers or support arms must themselves be folded, or at least pivoted out of the way, as the pivotal wings of the tool bar assemblies are folded up.

Accordingly, it would be an advance in the agricultural art to provide a wide swath tool bar assembly that can be folded up into a compact form that is neither unduly high nor unduly lengthy relative to the tractor or other frame on which the tool bar assembly is carried.

SUMMARY OF THE INVENTION

One aspect of this invention relates to an agricultural tool bar assembly that mounts to a movable frame. The tool bar assembly comprises a central section having opposite ends that carry pivotal wings, each wing comprising an inner pivot that pivotally joins an inner wing section to one end of the central section and an outer pivot that pivotally joins an outer wing section of the wing to the inner wing section. The tool bar assembly has a substantially horizontal deployed position in which the central and wing sections thereof are aligned end-to-end with one another and extend laterally relative to the frame across a working width that is substantially wider than a maximum width of the frame. The tool bar assembly has a plurality of agricultural tools laterally spaced apart across the working width thereof with the agricultural tools engaging the ground in the deployed position. The tool bar assembly further has a transport/storage position in which the agricultural tools are raised out of contact with the ground. Each of the wings in the transport/storage position is folded lengthwise by pivoting the outer wing section substantially 180° about the outer pivot until the outer wing section at least partially overlies the inner wing section and each wing is inwardly swung to be located proximate to one side of the frame by pivoting the inner wing section substantially 90° about the inner pivot relative to the central section. The inner and outer pivots are substantially horizontal in the deployed position of the tool bar assembly with the inner and outer wing sections being independently pivotal from each other about the inner and outer pivots to permit independent ground following action of the wing sections in the deployed position. The inner and outer pivots are substantially vertical in the transport/storage position of the tool bar assembly to permit placement of the lengthwise folded and inwardly swung wings proximate to the sides of the frame. A tilting mount is provided for attaching the central section to the frame. The mount is configured for tilting the central section relative to the frame about a substantially lateral and horizontal pivot axis to change the orientation of the inner and outer pivots from the substantially horizontal orientation in the deployed position to the substantially vertical orientation in the transport/storage position.

Another aspect of this invention relates to an agricultural tool bar assembly which comprises a central section having a pair of pivotal wings. Each pivotal wing comprises pivotal inner and outer wing sections. The sections can be folded into a transport/storage position or unfolded into a substantially horizontal deployed position. A plurality of agricultural tools is carried on the central section and the inner and outer wing sections. The sections in the deployed position are aligned end-to-end laterally behind a rear end of a movable frame which mounts central section. In the transport/storage position, the central section still extends laterally behind the rear end of the frame but the pivotal wings have been folded forwardly at the ends of the central section to lie along opposite sides of the movable frame. In each folded pivotal wing, the inner wing section extends forwardly and upwardly at an angle from the central section and the outer wing section extends substantially rearwardly and horizontally from a front end of the inner wing section.

Yet another aspect of this invention relates to an agricultural tool bar assembly for mounting to a movable frame. The tool bar assembly comprises first and second sections that carry agricultural tools, the first and second sections being connected together by a pivot. The pivot comprises a pivot pin that is received in a split bearing or bushing with a portion of the pivot pin extending outwardly therefrom. The bearing or bushing has a slit along one side thereof to be compressible in a radial direction. The split bearing or bushing is long enough to extend into a pair of aligned apertures in a pair of spaced mounting ears provided on the first section. The ears are themselves partially split by slits that extend laterally along outer portions of the ears with the slits in the outer portions of the ears connecting back to one side of the apertures in the ears. A plurality of fasteners act on the ears in the manner of a clamp to draw the ears together tightly enough that the split bearing or bushing is radially compressed or pinched sufficiently tightly such that the pivot pin will become rigid relative to the ears. An apertured mounting flange is located on the second section with the flange being received on the outwardly extending portion of the pivot pin to pivotally journal the first and second sections together, the split bearing or bushing and pivot pin being replaceable by loosening the fasteners to release the split bearing or bushing from its tightly gripped condition within the ears.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
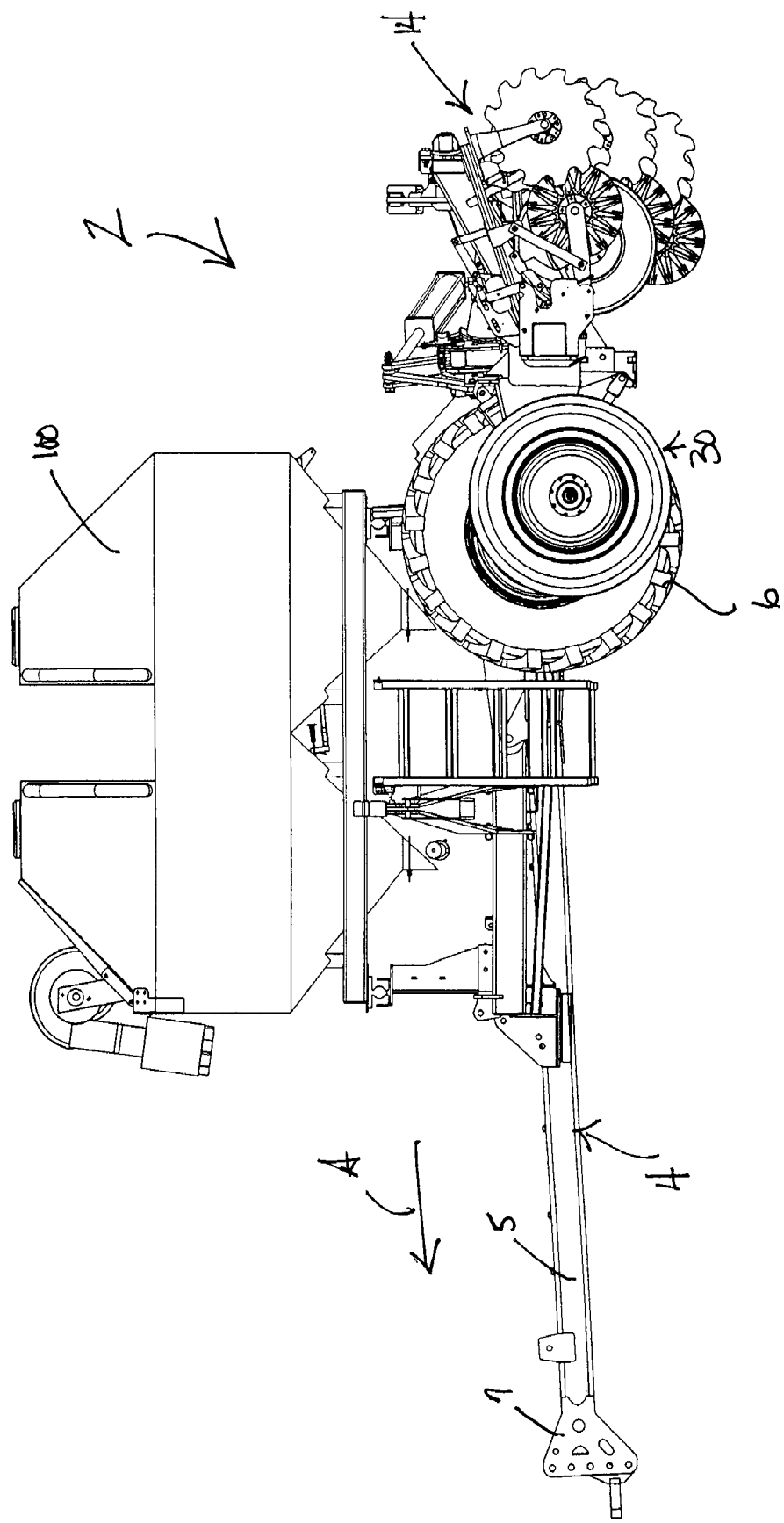
FIG. 1 is a side elevational view of a tool bar assembly according to this invention, shown attached to a tow frame that carries a material holding tank, particularly illustrating the tool bar assembly in a deployed, operative position for conducting an agricultural operation in a farm field.
Figure 2:
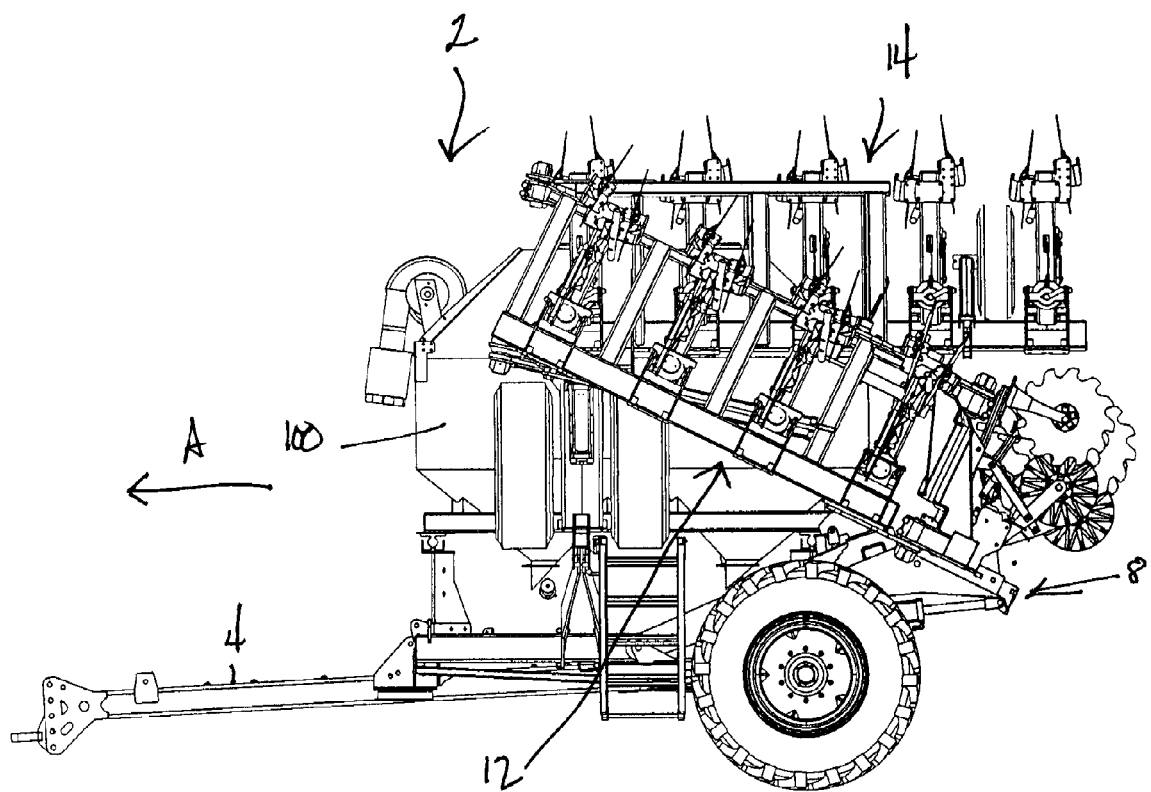
FIG. 2 is a side elevational view similar to FIG. 1, but showing the tool bar assembly in a fully folded transport/storage position on the tow frame.
Figure 3:
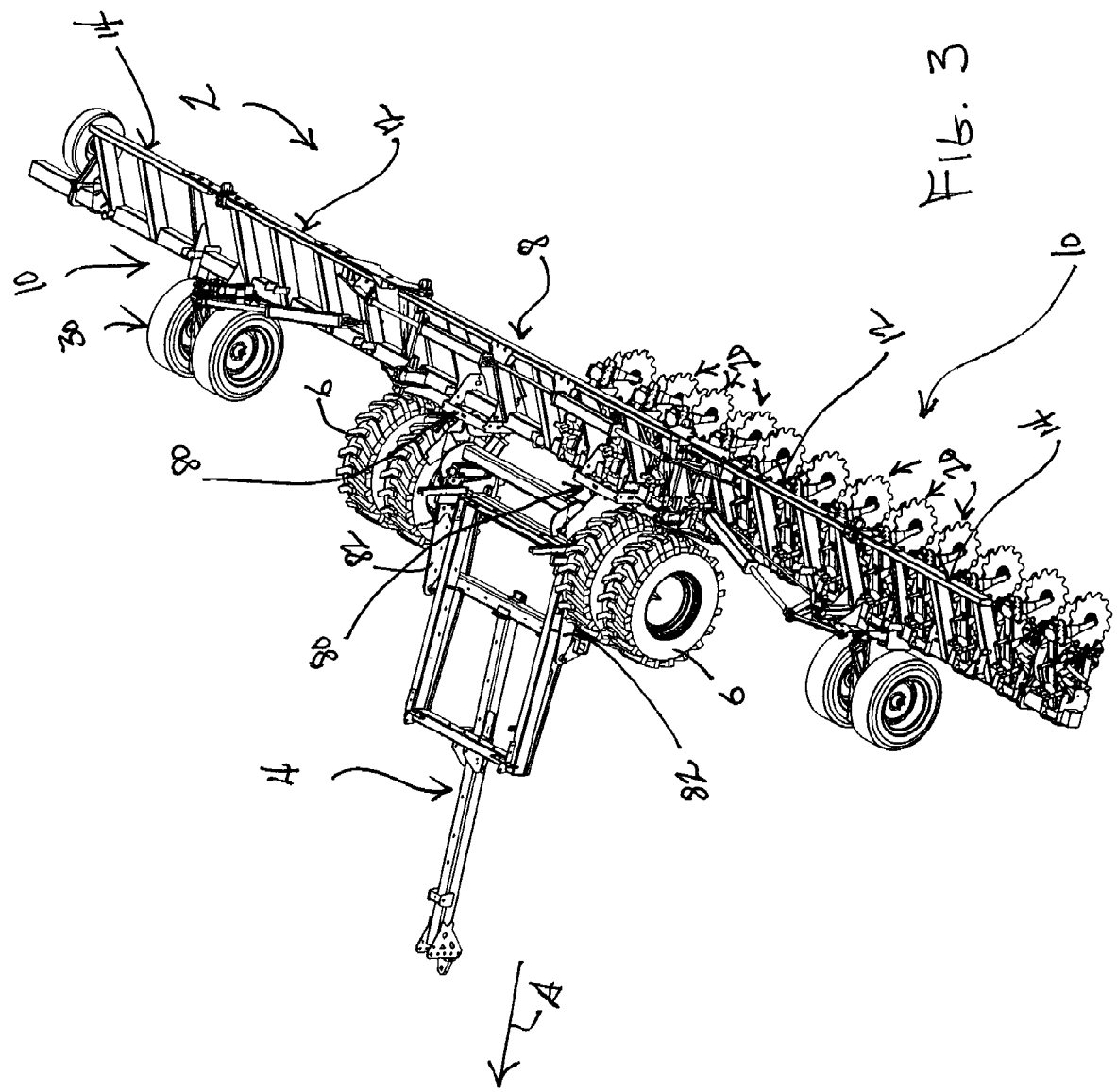
FIG. 3 is a perspective view of the tool bar assembly of FIG. 1 with the material holding tank of the tow frame having been removed for the sake of clarity, particularly showing the tool bar in the deployed operative position with a plurality of agricultural tools shown on the left side of the tool bar assembly and with such agricultural tools having been removed from the right side of the tool bar assembly for the sake of clarity.

One embodiment of a folding tool bar assembly according to this invention is generally illustrated as 2 in FIGS. 1-3. FIGS. 1 and 3 show tool bar assembly 2 in an unfolded, deployed and operative position. FIG. 2 shows tool bar assembly 2 in a fully folded transport/storage position.

Tool bar assembly 2 is carried on a movable frame 4 by means of which tool bar assembly 2 will be moved across a farm field in a direction of forward motion indicated by the arrow A in FIGS. 1-3. As shown in FIGS. 1-3, movable frame 4 includes a plurality of ground engaging wheels 6 that permit movable frame 4 to roll over the ground. Movable frame 4 includes a forwardly extending draft arm 5 with a hitch 7 that may be coupled to the rear of a traction vehicle, such as a tractor, that tows movable frame 4 across the farm field as the tractor drives across the farm field. Alternatively, tool bar assembly 2 could be carried directly on the back of the tractor rather than being carried by a separate movable tow frame. Thus, movable frame 4 is not limited to a tow frame as shown herein but can also comprise the frame of a self-propelled vehicle such as a tractor.

Tool bar assembly 2 comprises a central section 8 and a pair of pivotal wings 10 that are pivotally attached to either side of central section 8. Each pivotal wing 10 comprises a pair of sections, namely an inner wing section 12 and an outer wing section 14, which are additionally pivotally joined to one another. Thus, as shown in FIG. 3, tool bar assembly 2 comprises a left outer wing section 14, a left inner wing section 12, a central section 8, a right inner wing section 12, and a right outer wing section 14—five sections in all. Each pivotal wing 10 has two pivots, namely an inner pivot 16 between inner wing section 12 and one side of central section 8 and an outer pivot 18 between inner and outer wing sections 12 and 14. Thus, there are four pivots across the width of tool bar assembly 2, namely inner and outer pivots 16 and 18 in each of the two wings 10, which permit wings 10 to fold up in a manner to be described in more detail hereafter.

Referring to FIG. 3, when tool bar assembly 2 is unfolded and placed into a deployed, operative position, tool bar assembly 2 extends laterally behind movable frame 4 and has a width that is much wider than the width of movable frame 4. As shown in FIG. 3, tool bar assembly 2 carries a plurality of agricultural tools 20 thereon that are spaced apart relative to one another across the width of tool bar assembly 2. Agricultural tools 20 have been shown in FIG. 3 as having been installed only on the left pivotal wing 19 and on a portion of the left half of central section 8. Such agricultural tools 20 would be similarly carried on the remainder of central section 8 and the right pivotal wing 20 of tool bar assembly 2, but have been omitted in the drawings for the sake of clarity.

One such agricultural tool 20 that may be carried on tool bar assembly 2 is the zone tillage tool disclosed in U.S. Pat. No. 7,575,066. The '066 patent is assigned to the assignee, Environmental Tillage Systems, Inc., of this invention, and is hereby incorporated by reference. However, tool bar assembly 2 of this invention is not limited to carrying the zone tillage tool shown in the 066 patent, but may carry all sorts of agricultural tools 20 thereon. Such tools 20 may include planters, fertilizer applicators, other soil tillage or conditioning tools, etc.

When tool bar assembly 2 is in its deployed, operative position, the various sections 8, 12 and 14 thereof will be aligned with one another in an end-to-end fashion to extend in a straight lateral line behind movable frame 4. When movable frame 4 is traveling on level ground and tool bar assembly 2 is in its deployed, operative position, the various sections thereof will be level with one another as well as also shown in FIG. 3. If tool bar assembly 2 is traversing uneven ground, pivots 16 and 18 in wings 10 allow some up and down pivoting of inner and outer wing sections 12 and 14 relative to one another and relative to central section 8. Thus, outer wing section 14 can pivot up and down about outer pivot 18 relative to inner wing section 12, and inner wing section 12 can pivot up and down about inner pivot 16 relative to central section 8, to allow inner and outer sections 12 and 14 in each pivotal wing 10 to independently pivot to better follow the ground contours. Inner and outer pivots 16 and 18 in each pivotal wing 10 are substantially horizontally disposed when tool bar assembly 2 is in its deployed, operative position to permit the ground following action.

Figure 10:
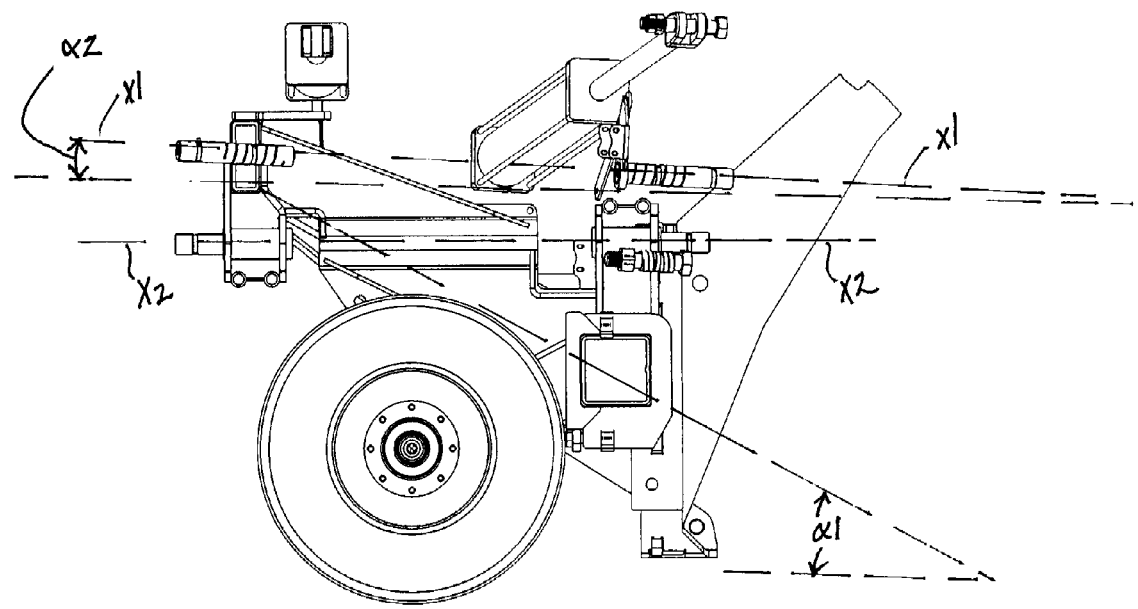
FIG. 10 is a diagrammatic side elevational view showing the angles of inclination of the pivot axes of the inner and outer pivots in the right pivotal wing when the tool bar assembly is in the deployed, operative position of FIG. 1.

Turning now to some of the structural details of tool bar assembly 2 of this invention, each section 8, 12 and 14 of tool bar assembly 2 has a similar structure comprising the following: 1.) a bottom, elongated, laterally extending tool bar 22 in the form of a large square hollow beam, 2.) a top, elongated, laterally extending rail 24 in the form of a smaller rectangular hollow beam, and 3.) a plurality of longitudinally extending stringers 26 that are laterally spaced apart from one another. Stringers 26 fixedly join tool bar 22 and top rail 24 together into a unitary structure. Thus, each section 8, 12 and 14 of tool bar assembly 2 has a basic two dimensional, rectangular shape which lies in a plane that contains bottom tool bar 22, top rail 24, and stringers 26. Referring to FIG. 10, when tool bar assembly 2 is in its deployed, operative position, each section 8, 12 and 14 of tool bar assembly 2 is tilted upwardly as it extends rearwardly at an acute angle $\alpha 1$ relative to horizontal.

Figure 4:
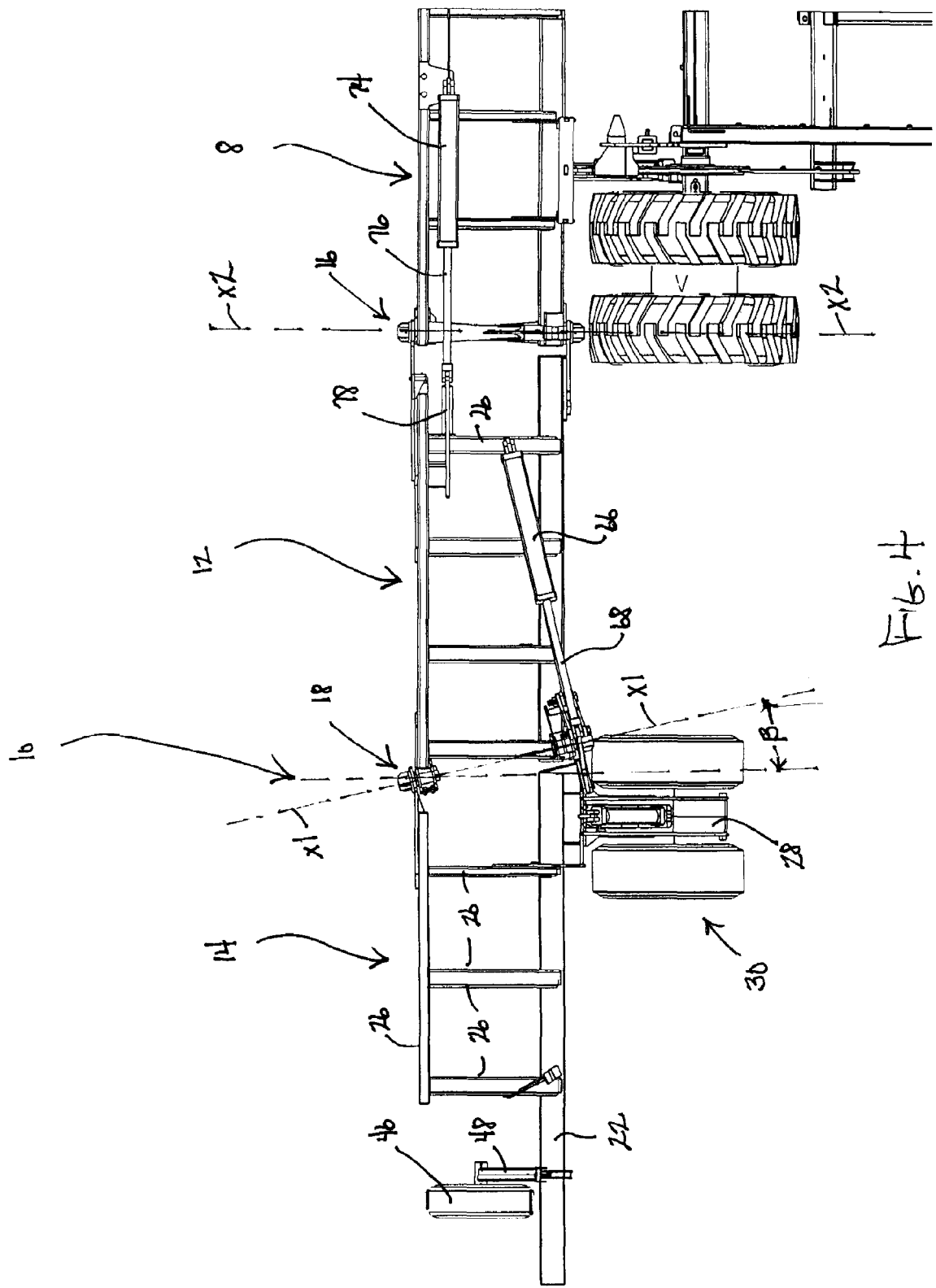
FIG. 4 is a top plan view of the right side of the tool bar assembly shown in FIG. 3, particularly illustrating the right side of the tool bar assembly without any agricultural tools mounted thereon to show half of the central section and the right pivotal wing of the tool bar assembly.

Referring now to FIG. 4, outer pivot 18 for each wing 10 defines a pivot axis x1 that is outwardly inclined relative to a straight fore-and-aft line as pivot axis x1 extends rearwardly. The outward inclination of outer pivot 18 is indicated by the angle $\beta$ as shown in FIG. 4. Moving inwardly in FIG. 4 to inner pivot 16 for each wing 10, one can see that the pivot axis x2 defined by inner pivot 16 is aligned with a straight fore-and-aft line. Pivot axis x2 of inner pivot 16 is not inclined either inwardly or outwardly but is located in a plane that extends in a straight fore-and-aft direction. These differences in the orientations of the pivot axes x1 and x2 of inner and outer pivots 16 and 18 affect how inner and outer wing sections 12 and 14 of each wing 10 fold up as will be explained in more detail hereafter.

Figure 5:
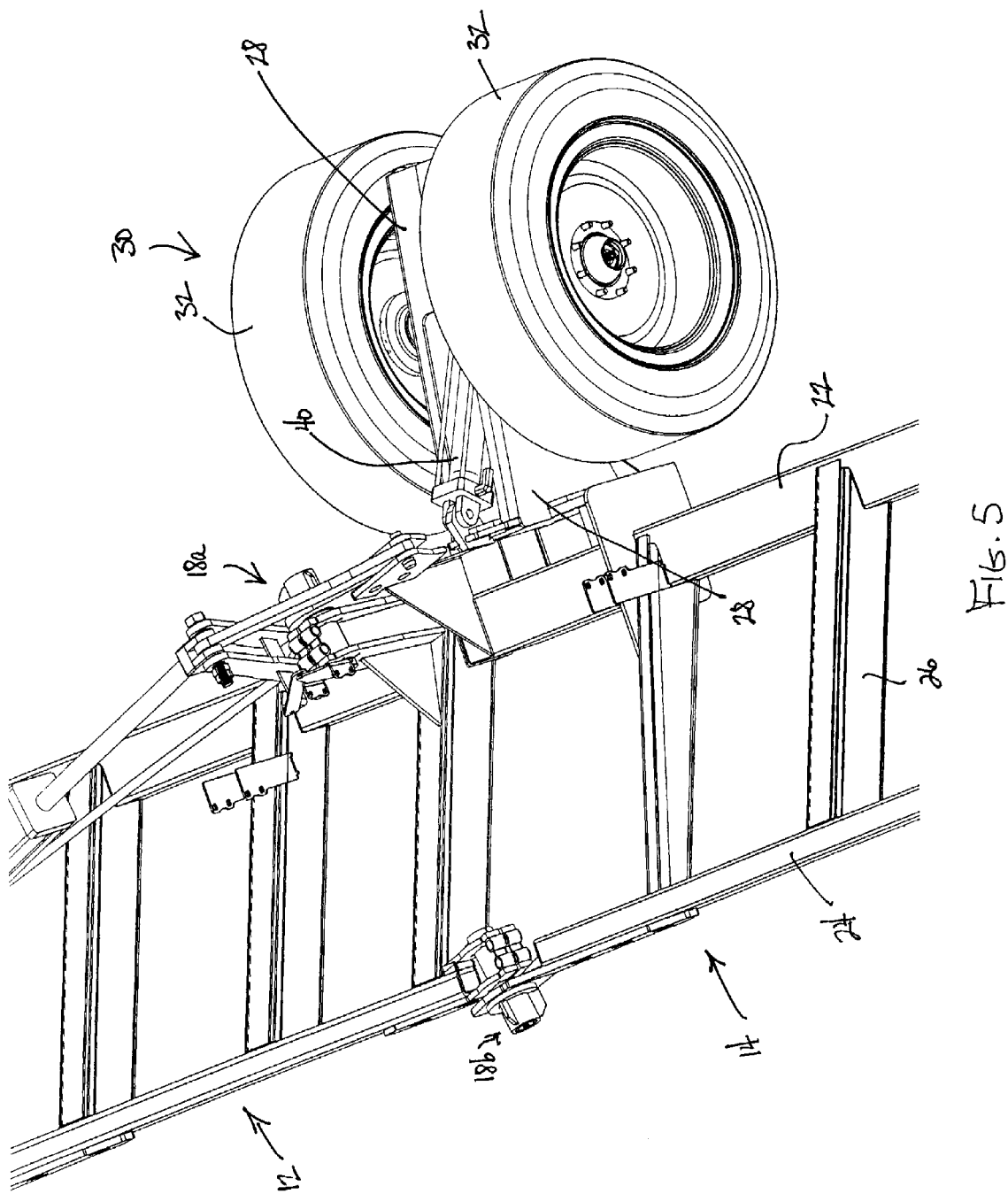
FIG. 5 is an enlarged perspective view of a portion of the right side of the tool bar assembly shown in FIG. 4, particularly illustrating the outer pivot at the junction between the inner and outer wing sections of the right pivotal wing and also illustrating the pair of retractable and extensible ground engaging wheels carried on the outer wing section.

Referring now to FIGS. 4 and 5, each outer wing section 14 of each pivotal wing 10 carries a wheel support housing 28 adjacent outer pivot 18. Wheel support housing 28 is fixed to the front of tool bar 22 and extends forwardly from tool bar 22. Wheel support housing 28 is fixed to tool bar 22 in any suitable manner, e.g. by being bolted thereto. Wheel support housing 28 carries a pair 30 of ground engaging wheels 32 thereon with one wheel 32 being adjacent each side of wheel support housing 28.

Figure 6:
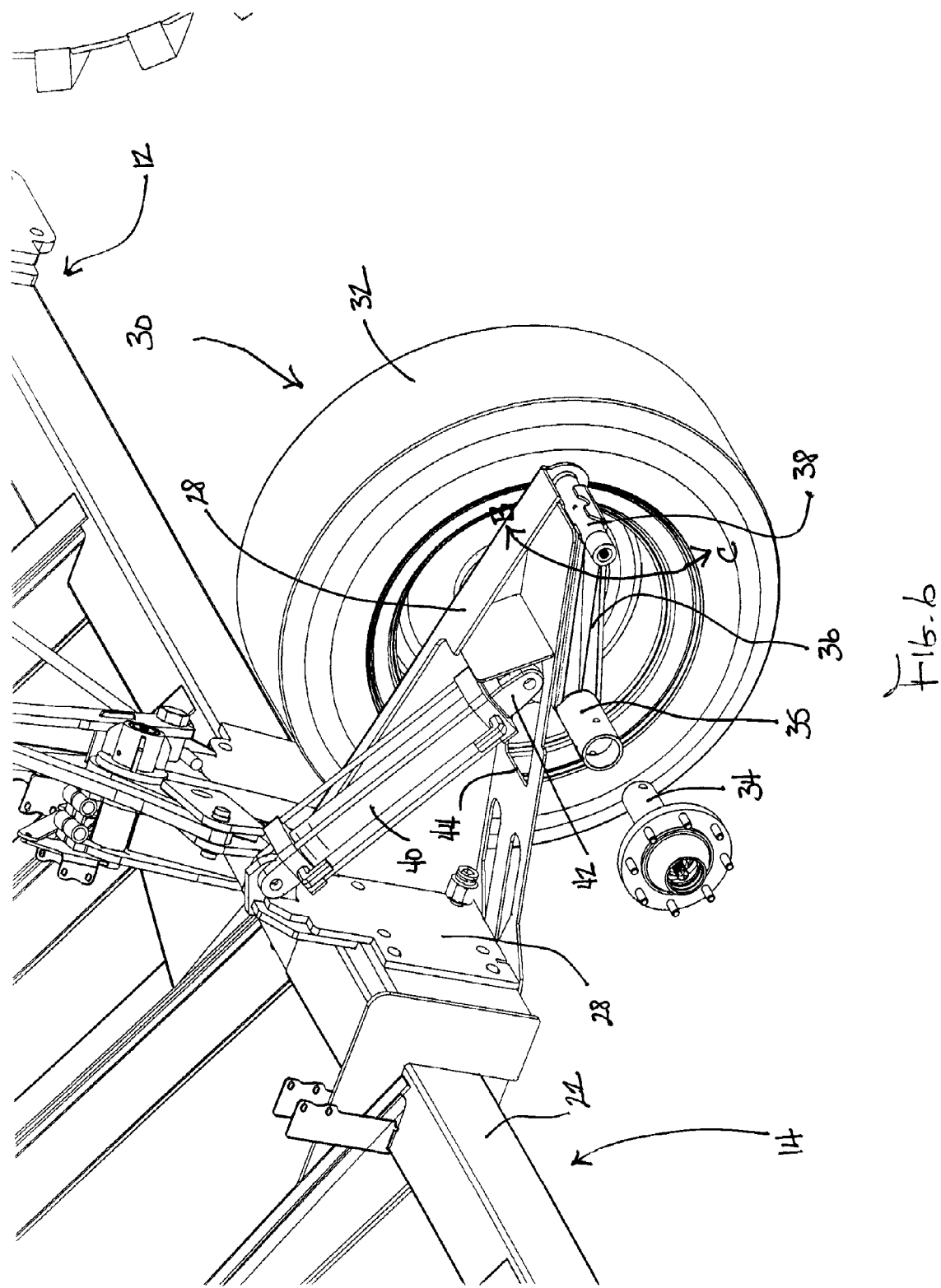
FIG. 6 is an enlarged perspective view of a portion of what is shown in FIG. 5 but taken from a different perspective than FIG. 5, particularly illustrating the pair of ground engaging wheels and their support within a wheel support housing carried on the outer wing section.

Referring now to FIG. 6, each wheel 32 in wheel pair 30 is secured to a spindle 34 with spindles 34 of wheel pair 30 being rotatably received in either end of an elongated transversely extending bearing or bushing 35. Bushing 35 is carried on a pivotal link arm 36 that pivots about a pivot pin 38 on the underside of the front of wheel support housing 28. A hydraulic cylinder 40 is carried in the interior of wheel support housing 28 with its upper end being pivotally connected to the portion of wheel support housing 28 that is bolted to tool bar 22. The extensible rod 42 of hydraulic cylinder 40 is pivotally connected to link arm 36 through a slot 44 provided in the bottom of wheel support housing 28. Thus, pivotal link arm 36 can pivot upwardly and downwardly about pivot pin 38 as indicated by the arrows B and C in FIG. 6, which moves bushing 35 that carries wheel pair 30 upwardly and downwardly towards and away from wheel support housing 28. The movement of wheel pair 30 relative to wheel support housing 28 will be described in more detail hereafter when the folding operation of pivotal wings 10 is described.

A major purpose of wheel pair 30 is to support the weight of outer wing section 14 on the ground at a spot proximate to the junction between inner and outer wing sections 12 and 14 when tool bar assembly 2 is in its deployed, operative position to help central section 8 carry the weight of such a wide tool bar assembly 2. Keeping wheel pair 30 in engagement with the ground is also needed during a turn around operation at the end of a pass across a farm field when the farmer swings or turns the movable frame 4 around to make another pass. In this turn around operation, the tool bar assembly gets lifted upwardly, using a pair of lift arms 82 that will be described later herein, to disengage tools 20 from the ground. However, it is desirable for support of tool bar assembly 2 that wheel pair 30 remains in engagement with the ground during the turn around operation. This is achieved by extending rod 42 of hydraulic cylinder 40 for each wheel pair 30 downwardly out of cylinder 40 simultaneously with the upward extension of the rods of the lift cylinders 86 that raise lift arms 82 so that wheels 32 of each wheel pair 30 stay on the ground during a turn around operation.

In addition to wheel pair 30 just described, each outer wing section 14 of each pivotal wing 10 may also carry a single, outer ground engaging wheel 46 adjacent the free end or tip of outer wing section 14. As shown in FIG. 4, outer wheel 46 is rotatably journalled on a support 48 that is simply clamped around the square cross section of the outer end of tool bar 22 of outer wing section 14. Support 48 extends rearwardly from tool bar 22 and so outer wheel 46 is located on an opposite side of tool bar 22 from wheel pair 30. In addition, unlike wheel pair 30 described earlier, outer wheel 46 is not movable towards or away from tool bar 22, but is simply clamped to tool bar 22 in a fixed position on tool bar 22.

Again, when tool bar assembly 2 is in its deployed, operative position, outer wheel 46 will also engage and roll on the ground to support the weight of outer wing section 14 at the free outer end thereof. Thus, when tool bar assembly 2 is in use, central section 8 is carried on movable frame 4 and each pivotal wing 10 further has two points of ground engaging support. The first point is provided generally midway between central section 8 and the outer tip of wing 10 by wheel pair 30. The second point is provided near the outer tip of wing 10 by the single additional ground engaging wheel 46.

The use of wheel pair 30 is considered to be more important in carrying the weight of wing 10 than the single outer wheel 46. In some circumstances, single outer wheel 46 could be removed if so desired. However, single outer wheel 46 does provide a height regulation feature and prevents the tip of outer wing section 14 from being forced too closely towards the ground. Such forcing would prevent tools 20 carried on outer wing section 14 from functioning as they should if too much downpressure is put onto outer wing section 14 from hydraulic cylinder 66, the downpressure function being described later herein. Thus, use of a single outer wheel 46, while less important than use of wheel pair 30, is preferred due to the height regulation advantages it provides.

Figure 7:
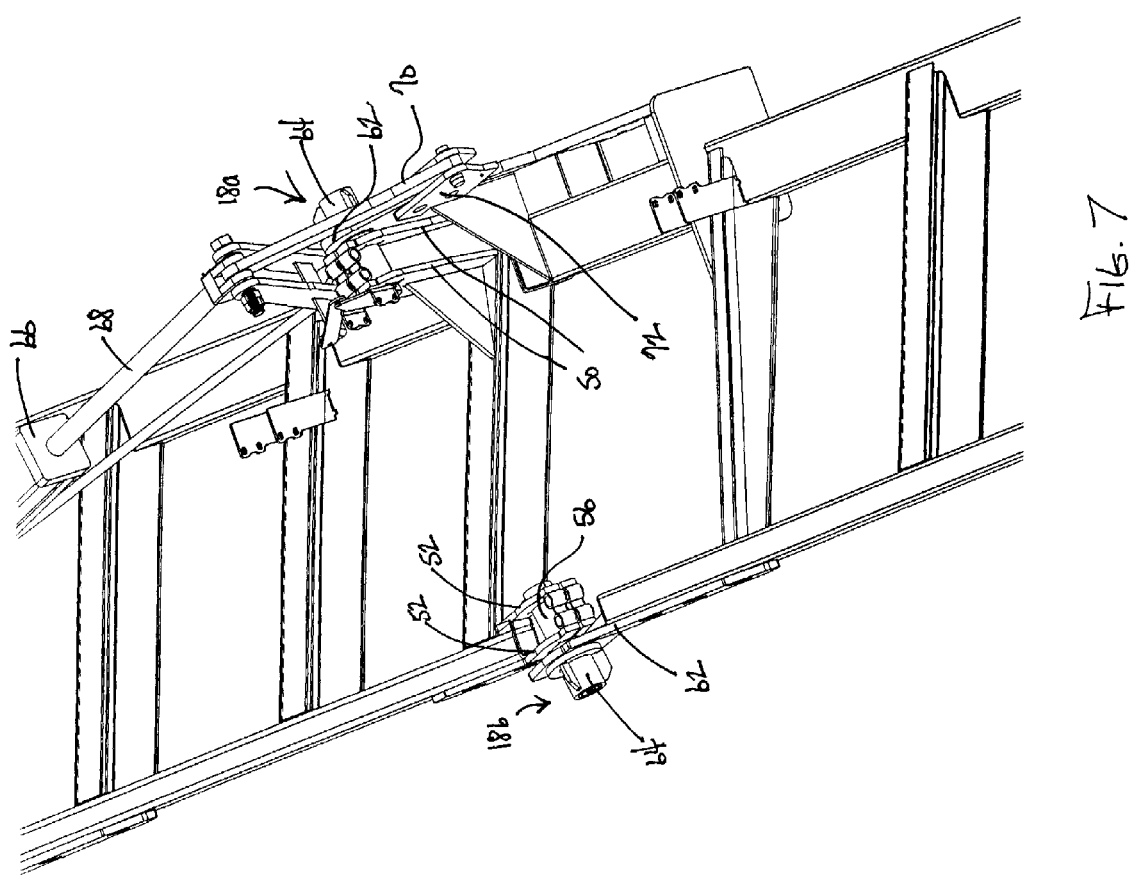
FIG. 7 is an enlarged perspective view similar to FIG. 5, but with the pair of ground engaging wheels having been removed for the sake of clarity.
Figure 8:
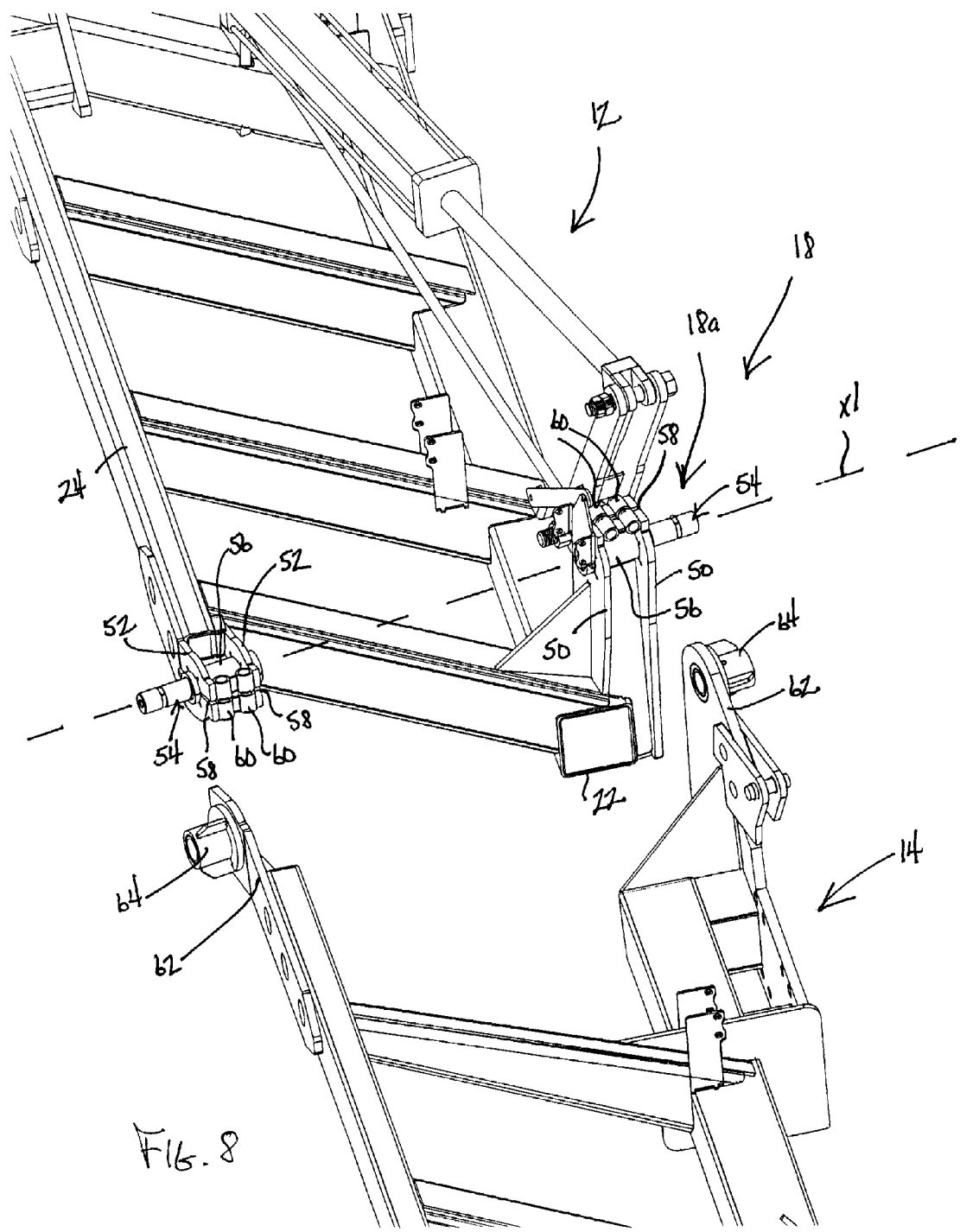
FIG. 8 is an enlarged perspective view similar to FIG. 7, but with the outer wing section having been pulled away from the inner wing section to better illustrate the structure of the outer pivot in the right pivotal wing.

Turning now to a description of outer pivot 18 as shown in FIGS. 5, 7 and 8, each outer pivot 18 comprises two separate pivot halves. A first half 18a of outer pivot 18 is located at the junction between tool bars 22 of inner and outer wing sections 12 and 14. A second half 18b of outer pivot 18 is located at the junction between top rails 24 of inner and outer wing sections 12 and 14.

FIG. 8 illustrates the outer end of inner wing section 12 with outer wing section 14 having been exploded away from inner wing section 12. FIG. 7 is similar to FIG. 8 but shows inner and outer wing sections 12 and 14 joined to one another by outer pivot 18.

Referring to both FIGS. 7 and 8, first and second halves 18a and 18b of outer pivot 18 are generally identical to one another except that first pivot half 18a is vertically elevated above tool bar 22 by virtue of being held between a pair of vertically extending, relatively tall ears 50 carried on inner wing section 12. Second pivot half 18b is similarly held between a pair of vertically extending and much shorter ears 52 carried on top rail 24 of inner wing section 12. Note that ears 50, 52 for pivot halves 18a, 18b are bent or twisted relative to tool bar 22 and top rail 24 of inner wing section 12 to establish the twisted or inclined orientation of outer pivot 18 that was indicated by the angle β in FIG. 4. Pivot pins 54 carried in pivot halves 18a and 18b are thus inclined to the outside to jointly form the twisted or inclined pivot axis x1 of outer pivot 18.

In order to provide a strong and durable outer pivot 18, each pivot pin 54 in each pivot half 18a and 18b is received in a split bearing or bushing 56 that has a slit (not shown) along one side thereof to be compressible in a radial direction. Split bushing 56 is long enough to extend into, through and slightly beyond a pair of aligned apertures in the pair of ears 50, 52 in each pivot half 18a, 18b. Pivot pin 54 is inserted through split bushing 56 with a substantial portion of pivot pin 54 extending outwardly from one end of split bushing 56. As shown in FIG. 8, the outwardly extending portion of pivot pin 54 carried on top rail 24 of inner wing section 12 extends rearwardly relative to top rail 24 while the outwardly extending portion of pivot pin 54 carried on tool bar 22 of inner wing section 12 extends forwardly relative to tool bar 22.

Ears 50, 52 that hold split bushing 56 in each pivot half are themselves partially split by slits 58 that extend laterally along the outer portions of ears 50, 52 with slits 58 connecting back to one side of the pin receiving apertures in the ears. The split portions of ears 50, 52 are connected by cooperating threaded fasteners 60 much like those used on hose clamps such that the split portions of ears 50, 52 can be drawn together towards one another when fasteners 60 are tightened. When fasteners 60 are tightened sufficiently far, the split portions of ears 50, 52 are drawn together tightly enough that split bushing 56 held between ears 50, 52 is radially compressed or pinched to tightly grip pivot pin 54. In fact, pivot pin 54 is so tightly gripped that it will become rigid relative to ears 50, 52 and split bushing 56 and will not rotate about its axis. Thus, pivot pin 54 in each pivot half 18a, 18b essentially becomes a rigid part of inner wing section 12 when fasteners 60 are tightened are enough.

Outer wing section 14 is provided with a mounting flange 62 on each of tool bar 22 and top rail 24 thereof. Mounting flanges 62 on outer wing section 14 are each bent or twisted relative to tool bar 22 and top rail 24 to conform to the bent or twist applied to ears 50, 52 on inner wing section 12. In addition, a solid bearing or bushing 64, i.e. a bushing that is not slit along its length on one side thereof as is the case with bushing 56, is carried on the exterior of each mounting flange 62. Each mounting flange 62 and bushing 64 carried thereon has a central bore or passageway to allow mounting flange 62 and bushing 64 to be received on the outwardly extending portion of pivot pin 54 in one of pivot halves 18a, 18b. Thus, outer wing section 14 is pivotally journalled on inner wing section 12 with bushings 64 carried on mounting flanges 62 of outer wing section 14 simply rotating around the outwardly protruding and non-rotatable portions of pivot pins 54 that are clamped in pivot halves 18a, 18b by the split portions of ears 50, 52 and by split bushing 56.

Figure 9:
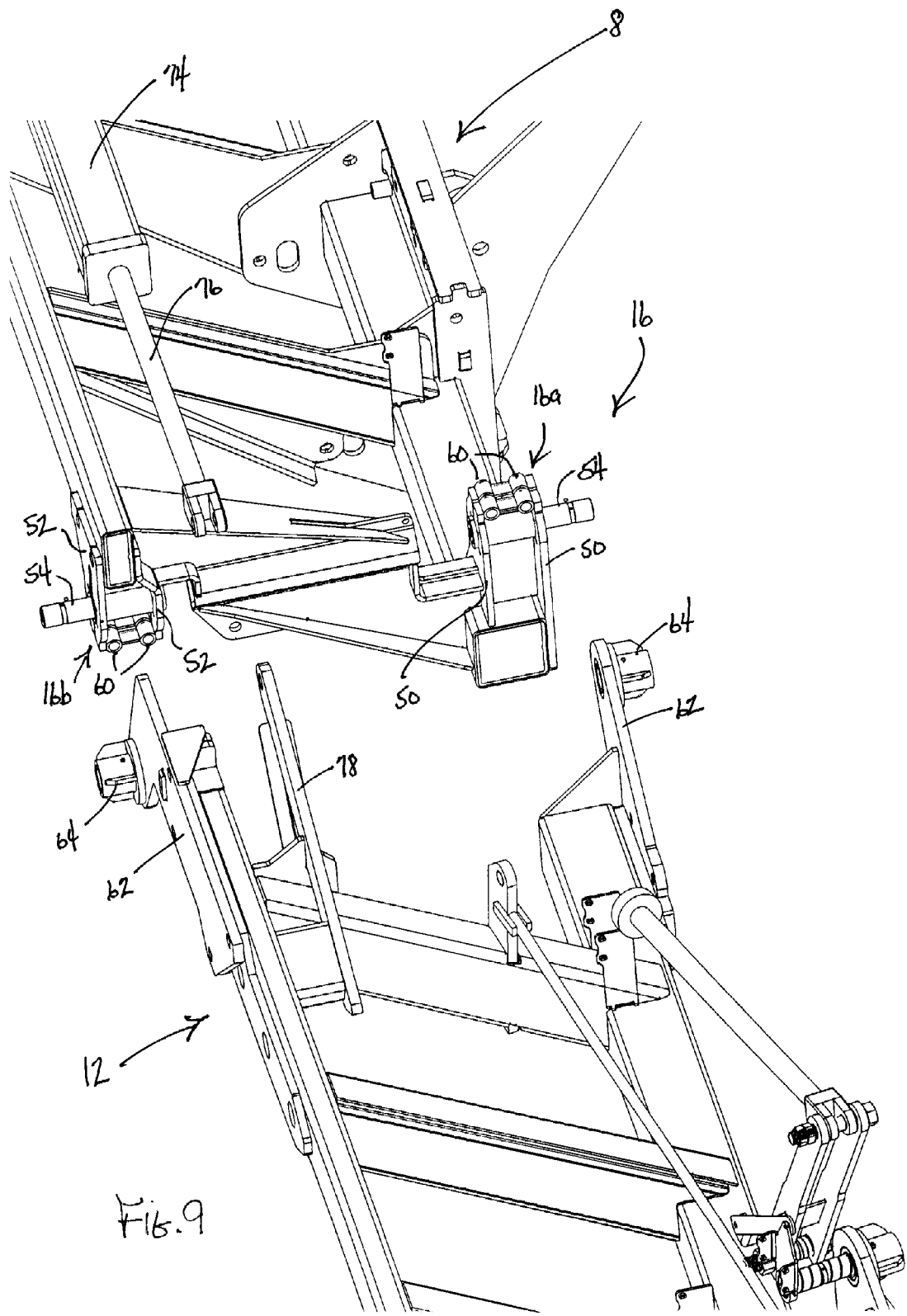
FIG. 9 is an enlarged perspective view of a portion of the right side of the tool bar assembly shown in FIG. 4, particularly illustrating the inner pivot at the junction between the central section and the inner wing section of the right pivotal wing with the inner wing section having been pulled away from the central section to better illustrate the structure of the inner pivot in the right pivotal wing.

Referring now to FIG. 9, essentially the same pivot structure is used for inner pivot 16 between inner wing section 12 and central section 8 of tool bar assembly 2. The side of central section 8 of tool bar assembly 2 has two similar pivot halves 16a, 16b each comprising a pair of ears 50, 52, a split bushing 56, and split outer portions of ears 50, 52 that are tightened by fasteners 60 to compress split bushing 56 around a pivot pin 54 to hold pivot pin 54 rigidly and non-rotatably. The inner end of inner wing section 12 has on each of tool bar 22 and top rail 24 a mounting flange 64 carrying a bushing 64 rotatably received on the outwardly extending portion of pivot pin 54. Thus, the same extremely durable pivot structure that is used in outer pivot 18 is also used in inner pivot 16.

One difference between inner and outer pivots 16 and 18 is their angle relative to the horizontal when tool bar assembly 2 is in its deployed, operative position. As shown in FIG. 10, the pivot axis x1 of outer pivot 18 is inclined slightly upwardly as it extends rearwardly by a small acute angle identified as $\alpha 2$ in FIG. 10. However, the pivot axis x2 of inner pivot 16 is substantially horizontal as shown in FIG. 10. Thus, in addition to be inclined laterally to the outside as it extends rearwardly as shown by the angle $\beta$ in FIG. 4, the pivot axis x1 for outer pivot 18 is also inclined slightly upwardly as shown by the angle $\alpha 2$ in FIG. 10. These tilt angles $\beta$ and $\alpha 2$ are absent for inner pivot 16. Inner pivot 16 is aligned with a straight fore-and-aft direction without any lateral tilt $\beta$ and is substantially horizontal without any upward tilt $\alpha 2$ when tool bar assembly 2 is in its deployed, operative position.

Referring again to FIG. 4, powered actuators in the form of hydraulic cylinders are provided for pivoting inner and outer wing sections 12 and 14. A first hydraulic cylinder 66 is pivotally connected at one end to one of the longitudinal stringers 26 of inner wing section 12. The outwardly extending rod 68 of first hydraulic cylinder 66 is connected by any suitable pivotal linkage 70 to a bracket 72 on outer wing section 14. See FIG. 7. As shown in FIG. 4, first hydraulic cylinder 66, rod 68, and linkage 70 are rearwardly inclined relative to the lateral axis of inner wing section 12 by the same angle $\beta$ as the outward incline of the pivot axis x1 of outer pivot 18, so that first hydraulic cylinder 66 acts in a direction that is perpendicular to the pivot axis x1 of outer pivot 18. This allows rod 68 of first hydraulic cylinder 66 to lift and pivot outer wing section 14 relative to inner wing section 12 about pivot axis x1 of outer pivot 18 without binding.

There is a similar second hydraulic cylinder 74 with an outwardly extending rod 76 between central section 8 and inner wing section 12 to provide for pivoting of inner wing section 12 relative to central section 8. Second hydraulic cylinder 74 is pivotally coupled at one end to central section 8. Rod 76 of second hydraulic cylinder 74 has its end pivotally coupled to a bracket 78 on inner wing section 12. Thus, as rod 76 of second hydraulic cylinder 74 is retracted into the cylinder, inner wing 12 will pivot inwardly relative to central section 8. Note that rods 68, 76 of the both first and second hydraulic cylinders 66, 74 are shown in their positions in FIG. 4 corresponding to the deployed, operative position of tool bar assembly 2.

Tool bar assembly 2 has been described thus far only when pivotal wings 10 are unfolded and tool bar assembly 2 is in its deployed, operative position. As described previously, when in this position and when in use in conducting an agricultural operation in a farm field, inner and outer wing sections 12 and 14 of each pivotal wing 10 can tilt or pivot upwardly and downwardly about inner and outer pivots 16 and 18 on each wing to conform to the ground contours.

However, hydraulic cylinders 66 and 74 are preferably pressurized during operation of tool bar assembly 2 to put active downpressure on outer wing section 14 and inner wing section 12, respectively, with cylinder 66 applying approximately 600 psi of downpressure to outer wing section 14 and cylinder 74 applying approximately 900 psi of downpressure to inner wing section 12, though these pressure settings can obviously be varied. This downpressure can be needed to keep tools 20 carried on wing sections 12 and 14 in proper contact with the ground to perform properly. However, to allow wing sections 12 and 14 to tilt upwardly when required by the ground contours, such as by a rise or bump, which would require that the rods of cylinders 66 and 74 be forced back into their cylinders, a pressure relief is provided in the hydraulic system that is set only slightly higher (e.g. 20 to 30 psi higher) than the downpressure settings of the cylinders. This pressure relief allows wing sections 12 and 14 to travel over rises or bumps without having to fight against too high a cylinder pressure, with the normal downpressure being reapplied as soon as the rise or bump passes.

Turning now to a description of central section 8 of tool bar assembly 2, central section 8 obviously does not fold between its ends, but remains rigid as it lacks any pivots similar to inner and outer pivots 16 and 18. Central section 8 is the portion of tool bar assembly 2 that attaches to movable frame 4. In doing so, each side of central section 8 has a mount 80 for attaching to frame 4 with mount 80 being rigidly mounted to the front side of tool bar 22. FIG. 4 shows both mounts 80.

Figure 11:
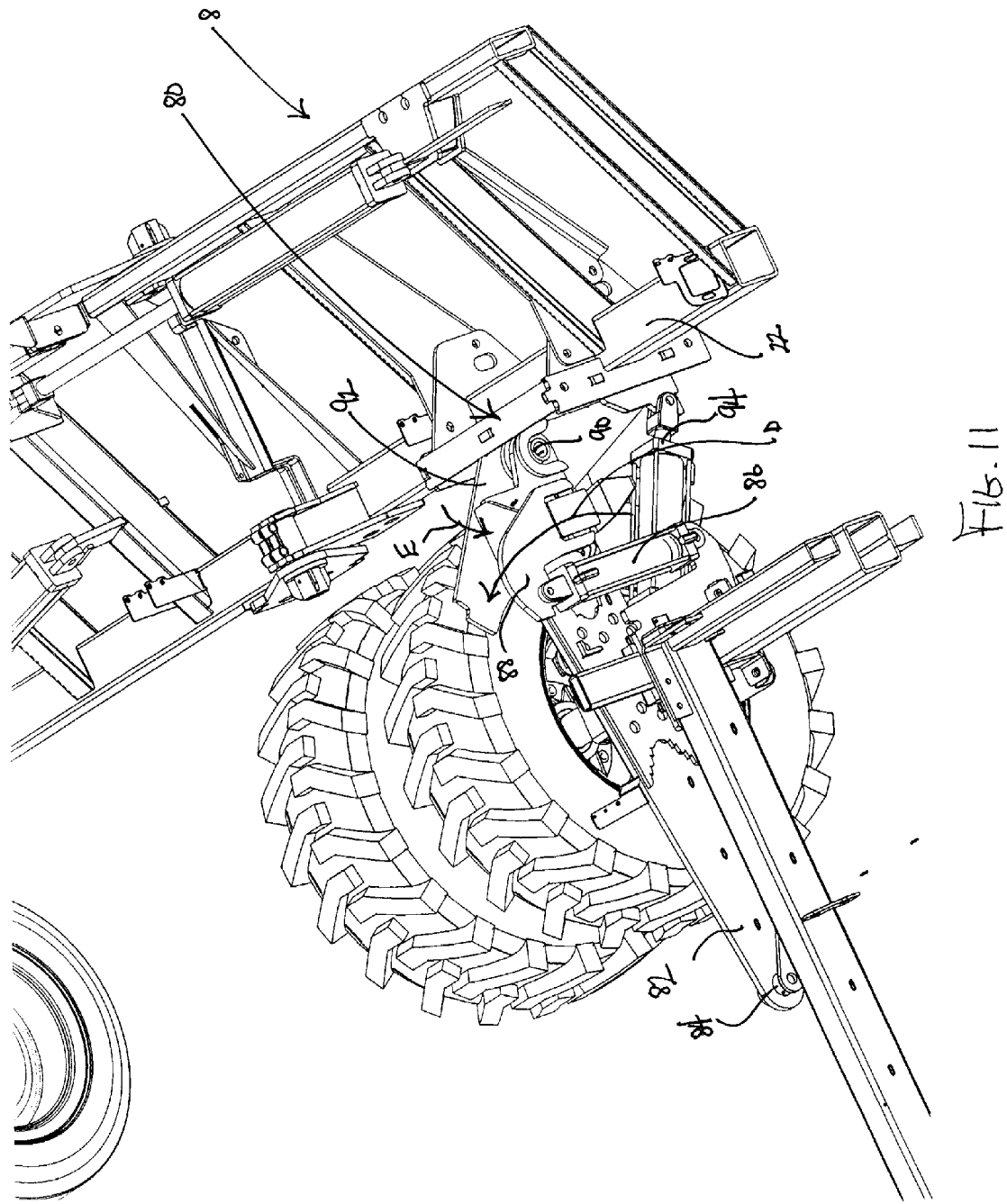
FIG. 11 is an enlarged perspective view of a portion of the right side of the tool bar assembly shown in FIG. 4, particularly illustrating one of the lift arms on the tow frame and the pivotal tilt connection between the central section of the tool bar assembly and the lift arm as well as the lift and tilt cylinders.

Referring now to FIG. 11, movable frame 4 has a pair of rearwardly extending lift arms 82 on either side thereof with each lift arm 82 being attached to one of the mounts 80 as will be described shortly. Each lift arm 82 is pivotal relative to movable frame 4 about a lateral substantially horizontal pivot axis 84. Each lift arm 82 is pivoted about pivot axis 84 by a hydraulic lift cylinder 86 that is pivotally connected at a bottom end thereof to movable frame 4. Lift cylinder 86 has a rod that can be extended upwardly out of the top end of lift cylinder 86 with the rod being pivotally connected to a link 88 that is rigidly fixed to the rear of lift arm 82. FIG. 11 shows one lift arm 82 in its lowered position with the rod of lift cylinder 86 being fully retracted corresponding to the deployed, operative position of tool bar assembly 2. When hydraulic pressure is applied to lift cylinder 86 and the rod of lift cylinder 86 is extended out of cylinder 86, lift arm 82 pivots upwardly about horizontal pivot axis 74 as shown by the arrow D in FIG. 11.

The rear end of lift arm 82 carries a horizontally extending pivot 90. Each mount 80 includes an upwardly extending tilt plate 92 that is pivotally journalled on pivot 90 at the rear end of lift arm 82. A tilt cylinder 94 extends between the underside of lift arm 82 and a portion of mount 80. Again, as shown in FIG. 11, tilt cylinder 94 is shown in a basically fully retracted position corresponding to the deployed, operative position of tool bar assembly 2. In this position, tool bars 22 in each of the central and pivotal wings 8, 10 have their square cross sections essentially in a level, untilted orientation. However, if the rod of tilt cylinder 94 is extended, the entire tool bar assembly 2 is able to pivot or tilt about the horizontal pivot axis formed by pivots 90 at the rear ends of lift arms 82 to additionally tilt tool bar assembly 2 relative to lift arms 82, as indicated by the arrow E in FIG. 11.

Thus, there are two modes of tilting of tool bar assembly 2 relative to the ground. The first tilt mode is the tilting that arises from pivoting the two lift arms 82 upwardly relative to the ground about pivot axis 84 using lift cylinders 86 that extend between movable frame 4 and lift arms 82. This also lifts and simultaneously tilts tool bar assembly 2 relative to the ground though tool bar assembly 2 has not been tilted relative to lift arms 82. The second tilt mode is a tilting of tool bar assembly 2 relative to lift arms 82 using tilt cylinders 94 that extend between lift arms 82 and the mounts 80 on tool bar 22 of central section 8. This additionally elevates tool bar assembly 2 by an upward pivoting or tilting of central section 8 of tool bar 22 about pivots 90 on the rear ends of lift arms 82. In the tilt mode arising from the use of tilt cylinders 94, lift arms 82 remain in a vertically stationary position. In the tilt mode arising from the use of lift cylinders 86, lift arms are pivoted upwardly and change their vertical position.

Figure 12:
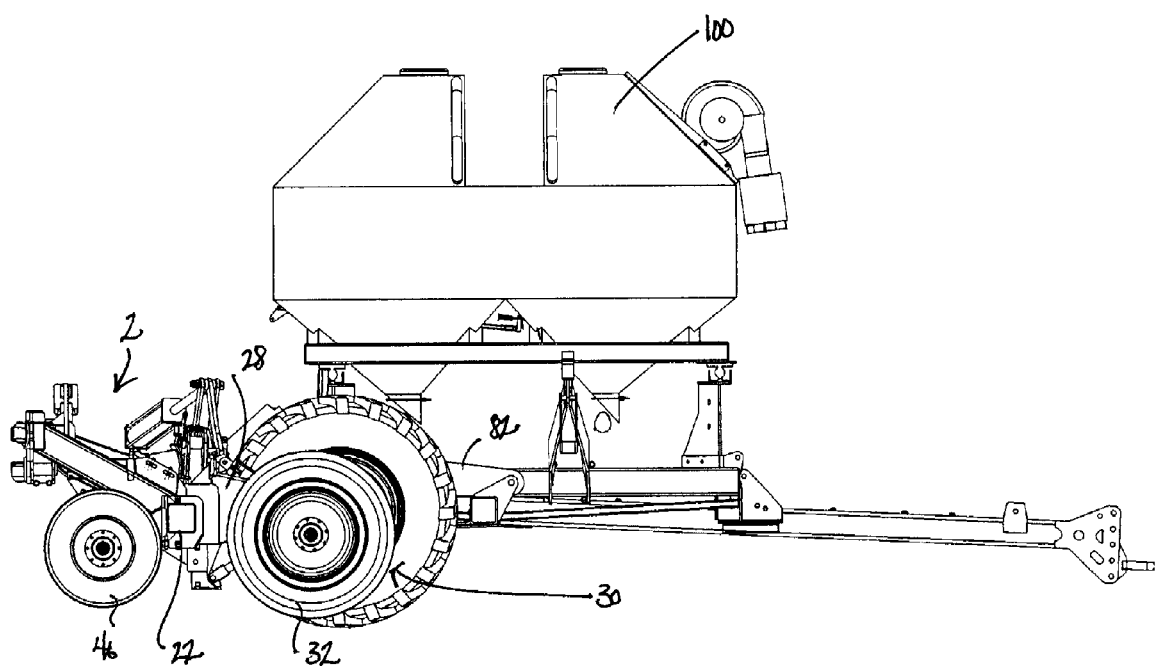
FIG. 12 is a side elevational view of the right side of the tool bar assembly shown in FIG. 1, particularly illustrating the tool bar assembly in its deployed, operative position.
Figure 13:
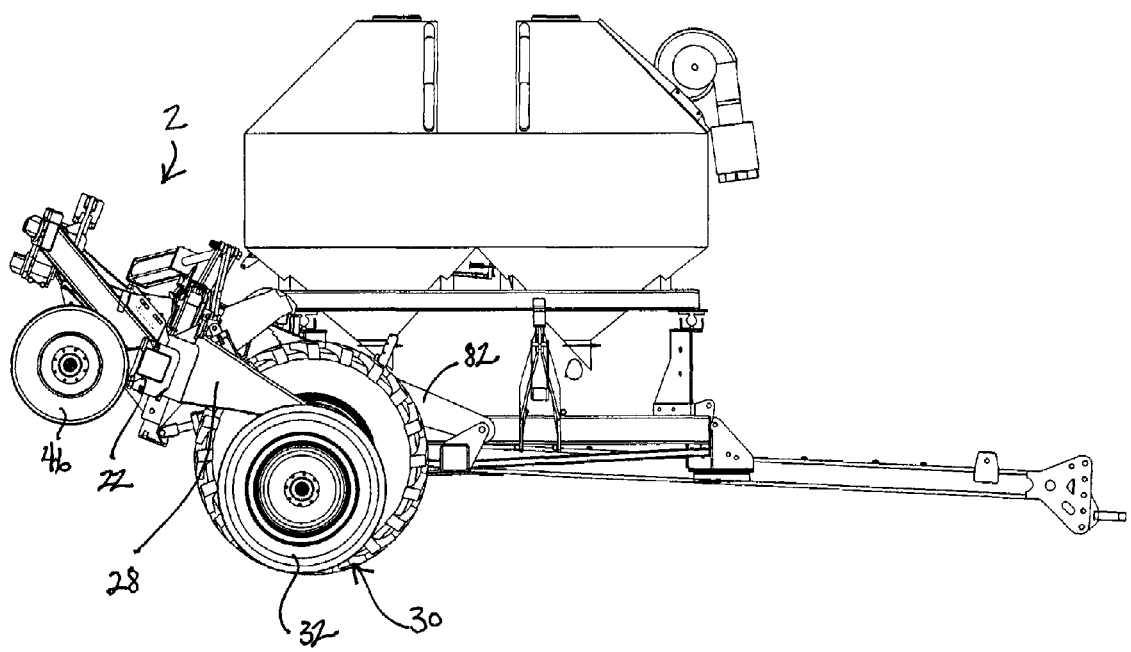
FIG. 13 is a side elevational view similar to FIG. 12, but showing the tool bar assembly at the conclusion of a first stage of folding in which the lift arms on the tow frame have been pivoted upwardly to lift and tilt the tool bar assembly by a first increment.

Let's assume now that the farmer is finished with the agricultural operation being performed in the field and wishes to fold tool bar assembly 2 up into a fully folded transport/storage position. The folding operation will be described in conjunction with FIGS. 12-22. The folding operation is done in the series of following steps:

The first stage of folding comprises lifting and tilting tool bar assembly 2 up off the ground by an upward pivoting of lift arms 82 relative to the rest of movable frame 4. This first stage is shown in FIG. 13. As one can see, the entire tool bar assembly has been lifted and tilted upwardly by virtue of the upward pivoting of lift arms 82 on movable frame 4. FIG. 13 shows lift arms 82 having been placed into a full up position. Note the change in orientation of the square cross-sectional shape of tool bar 22. This shape has been lifted and rotated prior to its level and untilted orientation in FIG. 12. FIG. 12 shows the tool bar assembly in its deployed, operative position prior to beginning the first stage of folding.

During the first stage of folding, however, it is desirable that wheel pair 30 on outer wing section 14 of each pivotal wing 10 remain in engagement with the ground. Thus, as tool bar assembly 2 gets lifted and tilted upwardly, the piston rod 42 will be extended out of cylinder 40 with wheels 32 in wheel pair 30 remaining in engagement with the ground, wheels 32 essentially dropping or extending down relative to wheel support housing 28 as piston rod 42 extends. Again, note the change in the position of wheels 32 relative to wheel support housing 28 from FIG. 12 to FIG. 13, which is a visual sign of how wheels 32 drop down as piston rod 42 extends. This extension of wheel pair 30 that keeps wheels 32 in engagement with the ground is the same action as what occurs during a turn around operation as described earlier herein.

Figure 14:
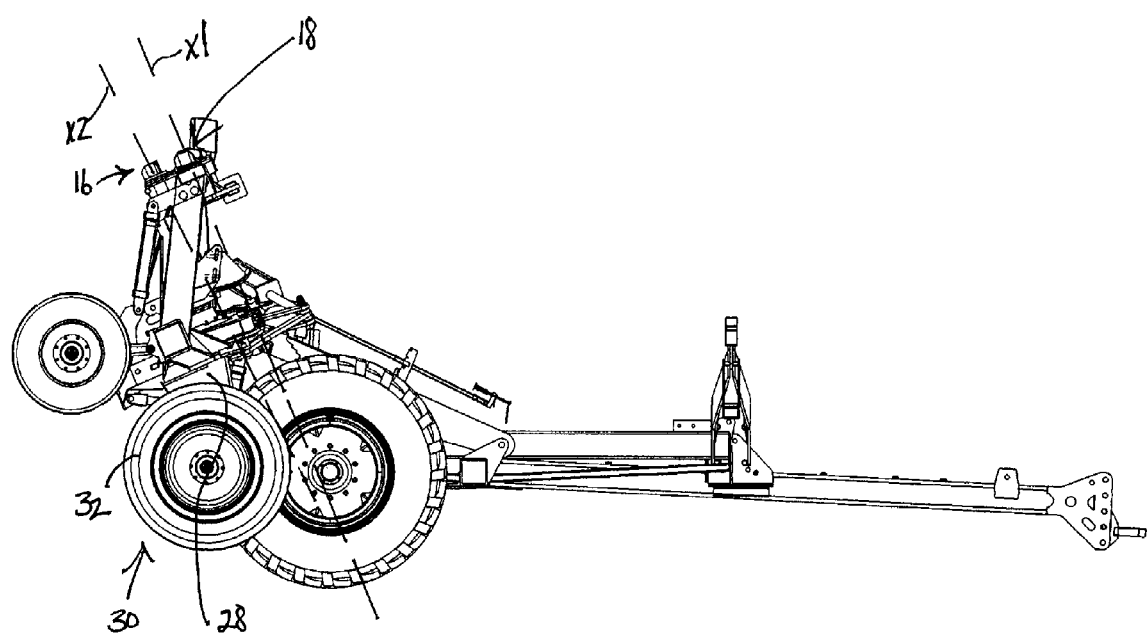
FIG. 14 is a side elevational view similar to FIG. 13, but showing the tool bar assembly at the conclusion of a second stage of folding in which the tool bar assembly have been titled on the lift arms on the tow frame to lift and tilt the tool bar assembly by an additional second increment.

The second stage of folding comprises keeping lift arms 82 in their full up position and then using tilt cylinders 94 on lift arms 82 to tilt tool bar assembly 2 around pivots 90 at the rear ends of lift arms 82. This then tilts the entire tool bar assembly 2 about lift arms 82 to further elevate and tilt tool bar assembly 2. FIG. 14 shows tool bar assembly 2 at the completion of the second stage of folding after tool bar assembly 2 has reached a full tilt position relative to lift arms 82. Again, note the change in orientation of the square cross-sectional shape of tool bar 22 from FIG. 13 to FIG. 14.

During this second stage of folding, usually at the beginning thereof, wheels 32 of wheel pair 30 on outer wing section 14 of each pivotal wing 10 are pulled back up against wheel support housing 28 by retracting piston rod 42 into cylinder 40 in wheel support housing 28. Referring to FIG. 13, the wheels 32 had dropped down relative to wheel support housing 28 during the first stage of folding by virtue of the extension of the piston rod 42 in the float mode. But, in the second stage of folding, the piston rod 42 is now powered to be retracted back into the cylinder 40, thereby drawing the wheels 32 back into their usual position relative to wheel support housing 28. This wheel retracted position 32 is shown in FIG. 14, which position resembles the same position the wheels had relative to wheel support housing 28 when tool bar assembly 2 was in its original deployed, operative position as shown in FIG. 12.

Figure 15:
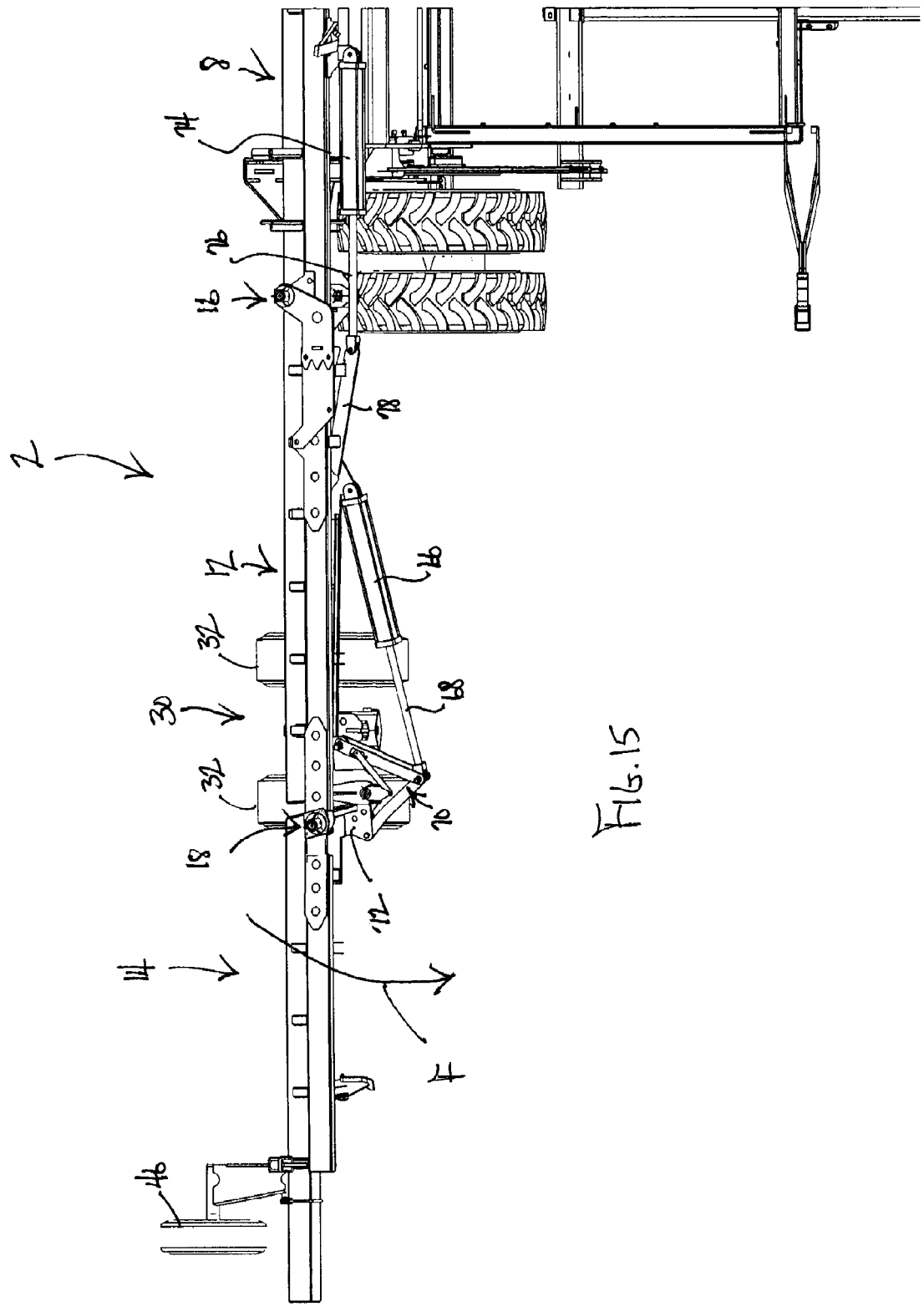
FIG. 15 is a top plan view of the tool bar assembly as shown in FIG. 14 at the conclusion of the second stage of folding.

Also, at the conclusion of the second stage of folding, note the substantial change in orientation of inner and outer pivots 16 and 18 on each pivotal wing 10. When tool bar assembly 2 was in its deployed, operative position as shown in FIG. 10, the pivot axes x2 and x1 of pivots 16 and 18 were substantially horizontal. But, now with tool bar assembly 2 shown in its fully elevated, fully tilted position, these pivot axes are now substantially vertical, though not completely vertical, with tool bar 22 having rotated or titled approximately 75° or so in total through the first and second stages of folding. See FIG. 14 for a depiction of the now substantially vertical orientation of the pivot axes x1 and x2 of outer and inner pivots 18 and 16 on pivotal wing 10. FIG. 15 depicts pivotal wing 10 of tool bar assembly as shown in FIG. 14 from above.

The third stage of folding comprises folding outer wing section 14 of pivotal wing 10 inwardly over inner wing section 12. This is done by retracting rod 68 in first hydraulic cylinder 66 to swing inner wing section 12 inwardly about the now substantially vertical pivot axis x1 formed by outer pivot 18 as shown by the arrow F in FIG. 15. As piston rod 68 retracts and outer wing section 14 pivots in the direction of arrow F, outer wing section 14 swings or pivots substantially 180° about pivot axis x1 of outer pivot 18. However, due to the lateral outward inclination β of pivot axis x1 of outer pivot 18, which lateral outward inclination β remains whether x1 pivot axis is substantially horizontal as in FIG. 4 or substantially vertical as in FIG. 14, outer wing section 14 both folds in over inner wing section 12 and elevates over inner wing section 12.

Figure 16:
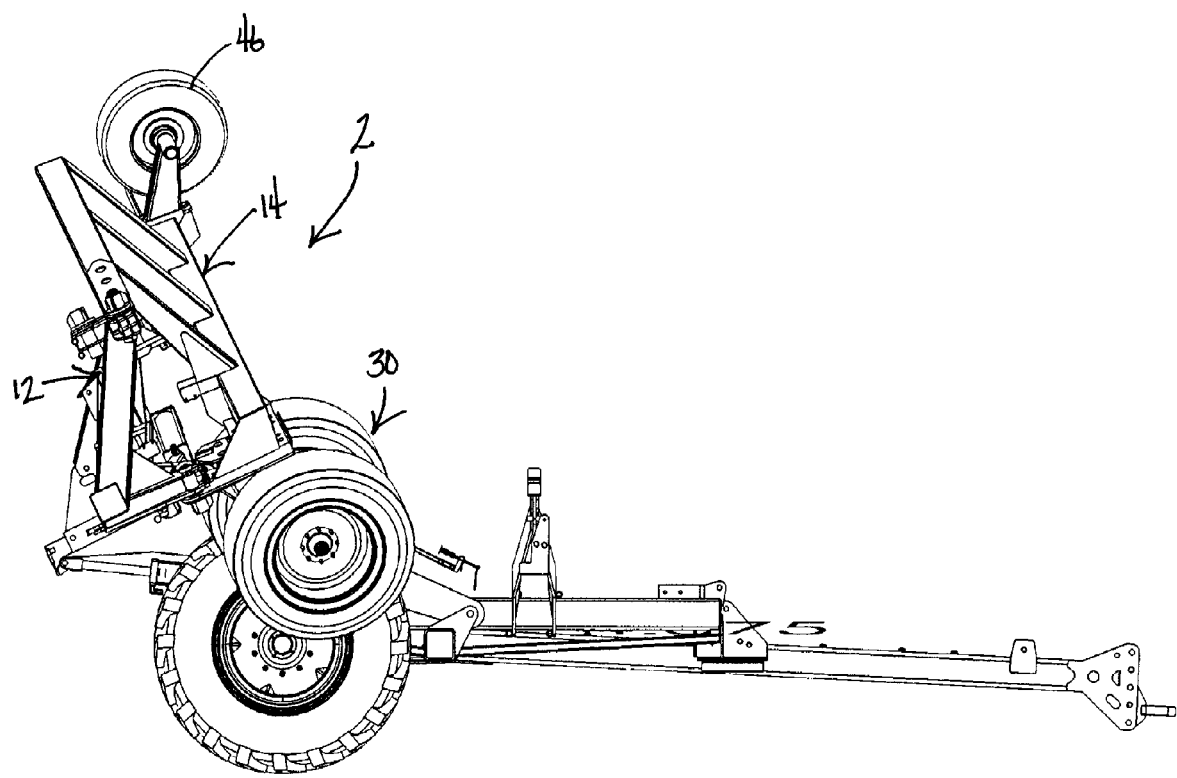
FIG. 16 is a side elevational view similar to FIG. 14, but showing the tool bar assembly at the conclusion of a third stage of folding in which the outer wing section has been pivoted substantially 180° relative to the inner wing section to cause the outer wing section to lift and elevate relative to the inner wing section as it overlies the inner wing section.
Figure 17:
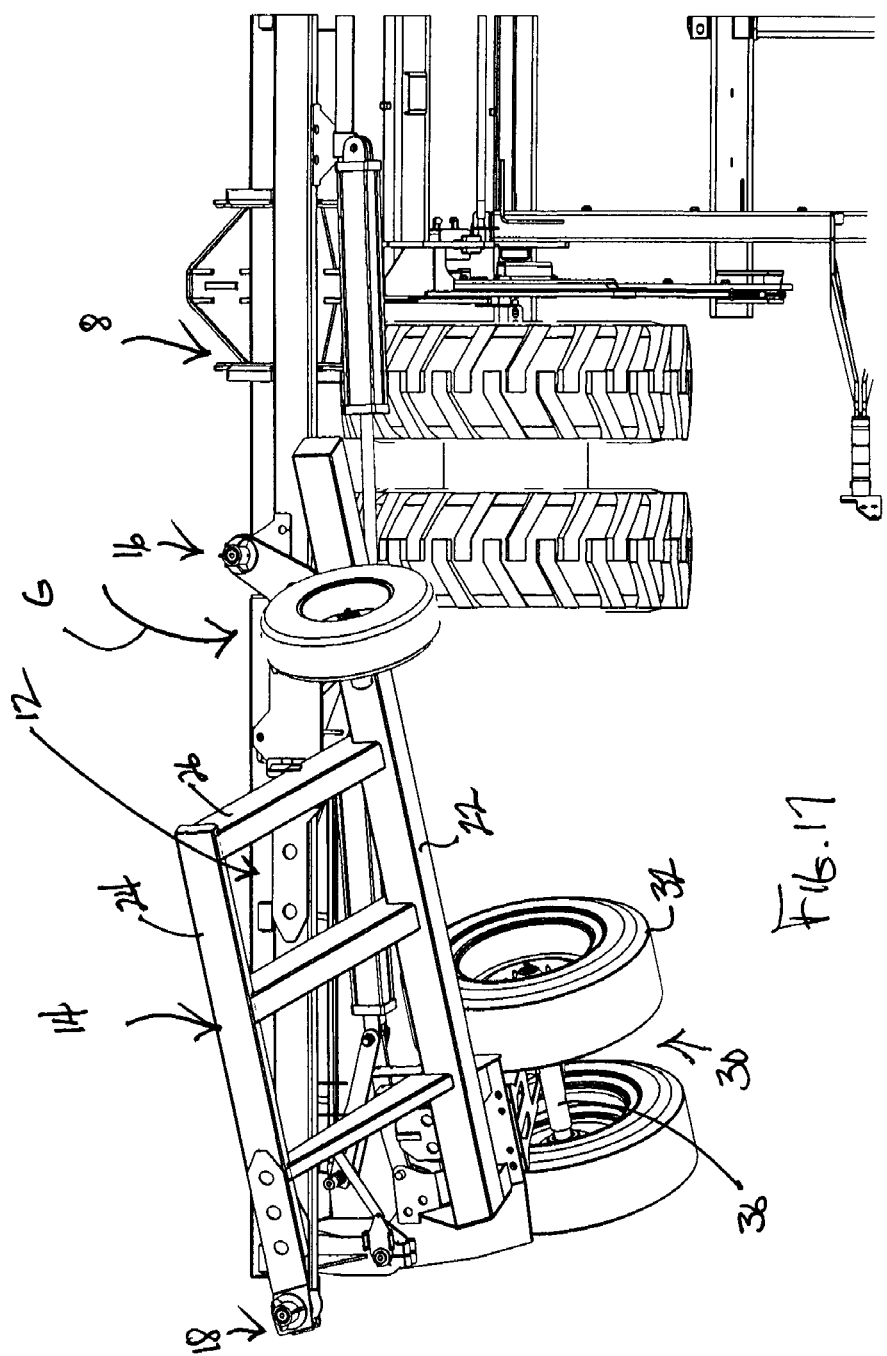
FIG. 17 is a top plan view of the tool bar assembly as shown in FIG. 16 at the conclusion of the third stage of folding.
Figure 18:
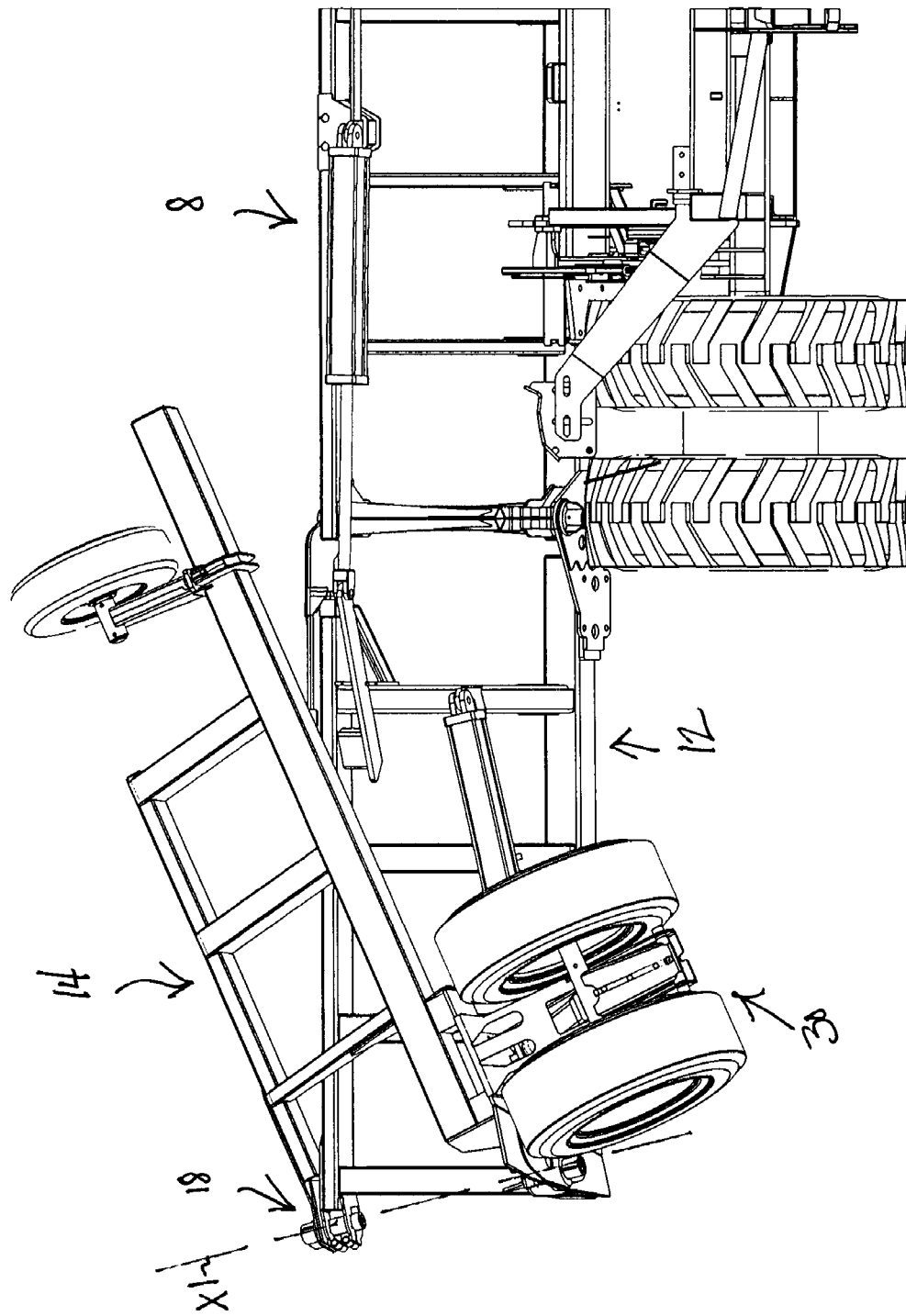
FIG. 18 is a front elevational view of the tool bar assembly as shown in FIG. 16 at the conclusion of the third stage of folding.

The lifting and elevating of outer wing section 14 relative to inner wing section 12 is shown in FIGS. 16-18, from the side, from the top, and from the front. The front view of FIG. 18 best shows the elevation of outer wing section 14 relative to inner wing section 12. Note how outer wing section 14 has tilted up into an upwardly inclined, tilted position relative to inner wing section 12. This is all due to the original lateral outward inclination β of pivot axis x1 of outer pivot 18 along with the fact that pivot axis x1 is moved from being substantially horizontal to being substantially vertical in the first and second stages of folding. Thus, during the third stage of folding, merely swinging or pivoting outer wing section 14 of tool bar assembly 2 about pivot axis x1 of outer pivot 18 by substantially 180° naturally results in outer wing section 14 being disposed in the lifted and elevated position shown in FIGS. 16-18.

The fourth and final stage of folding comprises pivoting inner wing section 12 of each pivotal wing 10 about inner pivot 16. Referring back to FIG. 14, the pivot axis x2 of inner pivot 16 at the conclusion of the second stage of folding is substantially vertical but not completely vertical with the pivot axis x2 of inner pivot 16 being inclined rearwardly as it extends upwardly in FIG. 14. Now, when inner wing section 12 is rotated substantially 90° about inner pivot 16 through the operation of second hydraulic cylinder 74, i.e. the cylinder extending between central section 8 and inner wing section 12, this will rotate inner wing section 12 with outer wing section 14 already folded against it about inner pivot 16 in the direction of the arrow G in FIG. 17.

Figure 19:
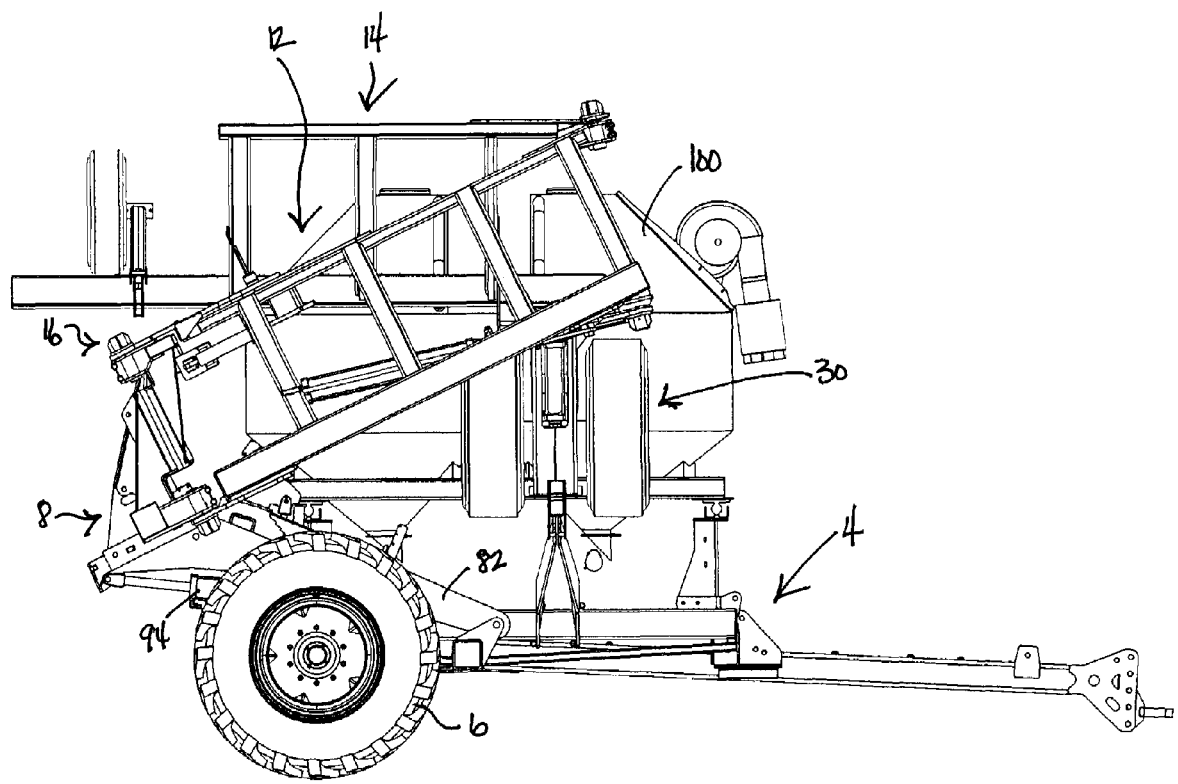
FIG. 19 is a side elevational view similar to FIG. 16, but showing the tool bar assembly at the conclusion of a fourth and final stage of folding in which the inner wing section has been pivoted substantially 90° forwardly relative to the central section of the tool bar assembly to cause the inner wing section to lift and elevate relative to the central section to extend longitudinally along one side of the material holding tank carried on the tow frame with the outer wing section being interposed between the inner wing section and the side of the material holding tank.
Figure 20:
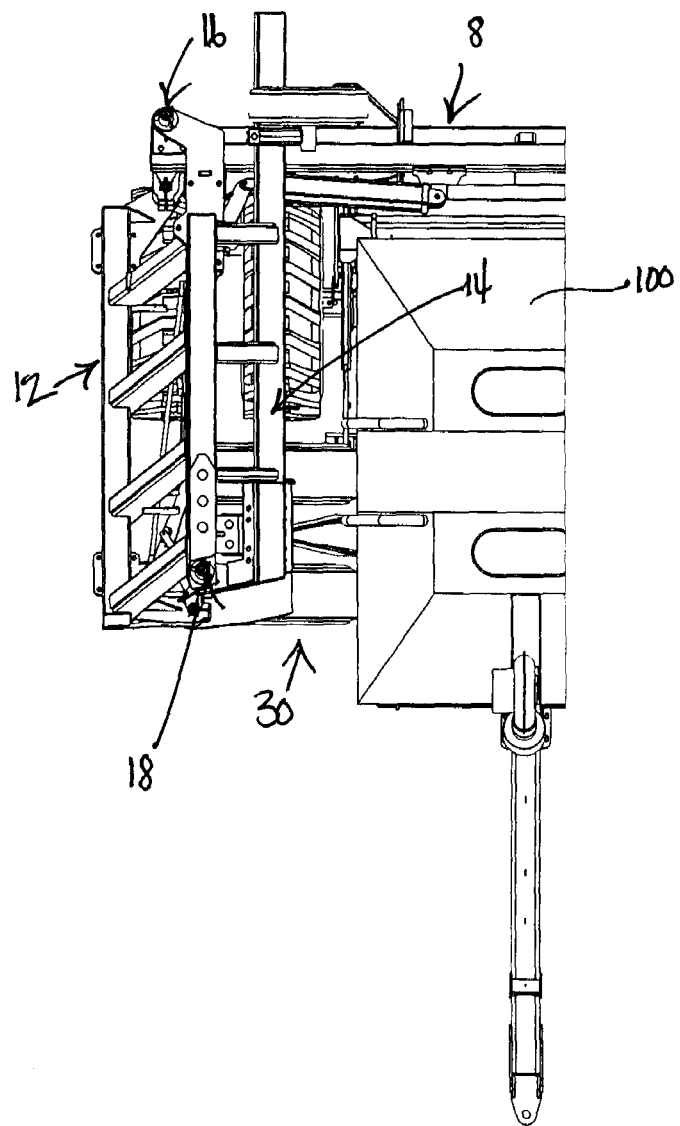
FIG. 20 is a top plan view of the tool bar assembly as shown in FIG. 19 at the conclusion of the fourth and final stage of folding.
Figure 21:
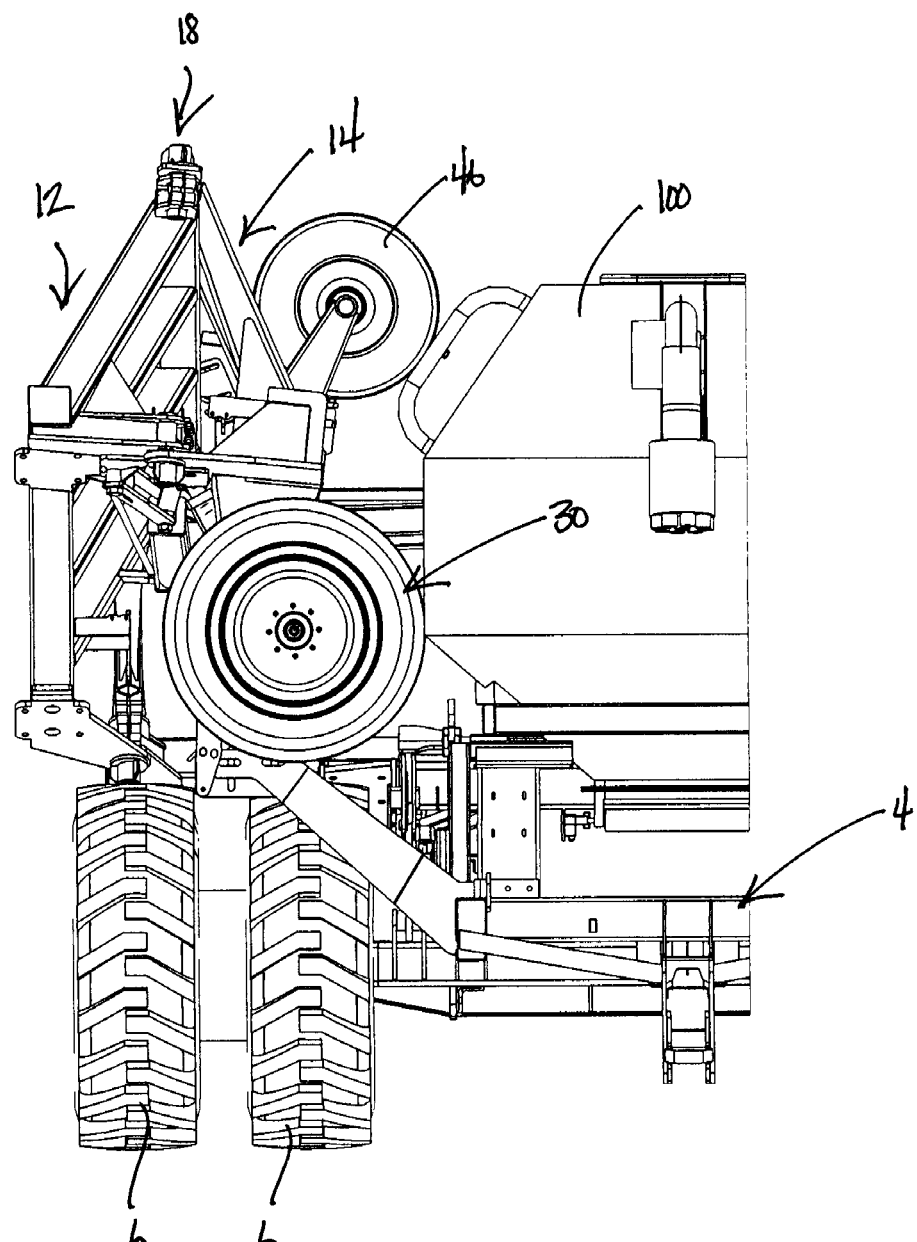
FIG. 21 is a front elevational view of the tool bar assembly as shown in FIG. 19 at the conclusion of the fourth and final stage of folding.

FIGS. 19-21 show tool bar assembly 2 in a fully folded orientation at the conclusion of the fourth stage of folding. As shown in FIGS. 19-21, the rotation shown by the arrow G in FIG. 17 will cause inner wing section 12 to both lift and elevate relative central section 8 of tool bar assembly 2 as inner wing section 12 rotates forwardly towards the side of movable frame 4. When this rotation is complete after substantially 90° of rotation, inner wing section 12 will extend substantially straight ahead in a fore and aft direction along one side of movable frame 4 with inner wing section 12 being tilted upwardly as it extends forwardly. Outer wing section 14, which was folded against inner wing section 12 in the third stage of folding, is now tucked inwardly of outer wing section 14 and is located proximate to one side of a material holding tank 100 carried on movable frame 4. Due to the original difference in the angles of the pivot axes x2 and x1 of inner and outer pivots 16 and 18, and due to the fact that these pivot axes x2 and x1 were not arranged to be completely vertical at the conclusion of the lifting and tilting of central section 8 of tool bar assembly 2 at the end of the second stage of folding, outer wing section 14 ends up extending substantially horizontally relative to movable frame 4 when inner wing section 12 is fully folded inwardly and is inclined upwardly. The wheel pair 30 on outer wing section 14 in the fully folded position, as shown in FIGS. 19-21, ends up being closely positioned adjacent the side of the material holding tank 100.

Figure 22:
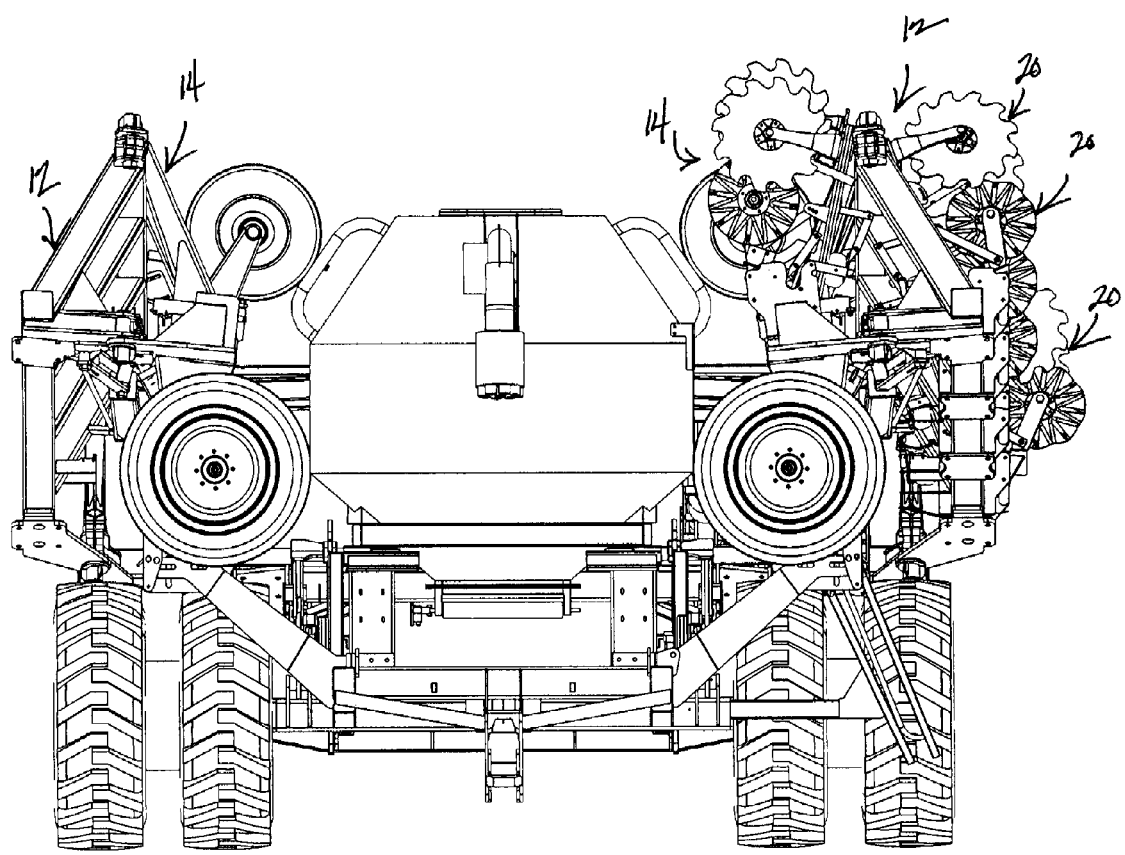
FIG. 22 is a front elevational view similar to FIG. 21, but showing both the left and right sides of the tool bar assembly in their fully folded positions adjacent opposite sides of the material holding tank with one side of the tool bar assembly having the agricultural tools carried thereon.

This concludes the description of how tool bar assembly 2 is placed into its fully folded transport/storage position on movable frame 4. When in the transport/storage position, tool bar assembly 2 of this invention is quite compact. As shown in FIG. 22, the folded inner and outer wings 12 and 14 of each pivotal wing 10, even when equipped with the zone tillage tools 20 shown in FIG. 22, do not extend substantially higher than the material holding tank 100 and do not extend laterally substantially beyond the wheelbase of the wheels 6 of movable frame 4. Thus, the folding action described and shown herein permits even a wide tool bar assembly 2, one having a 60 foot original width, to be compactly and neatly folded against the sides of movable frame 4 and against the sides of a material holding tank 100 carried on movable frame 4.

Tool bar assembly 2 of this invention can be unfolded and placed back into its deployed, horizontal position by reversing the folding steps 1-4 described above.

Tool bar assembly 2 of this invention does not depend upon the use of weight supporting stringers or members extending between movable frame 4 and pivotal wings 10. The structure of inner and outer pivots 16 and 18, with a pivot pin 54 being rigidly clamped by a split bearing 56 that has been tightly compressed, is sufficiently strong to generally make such stringers unnecessary. In addition, the truss shape structure of each wing section 12 and 14, comprising a tool bar 22, a parallel top rail 24, and longitudinal stringers 26 joining the two together, is itself very strong and resistant to flexing or bending. In addition, further support of pivotal wings 10 is provided by the ground engaging wheels carried on outer wing sections 14, particularly by the wheel pair 30 located near the junction of inner and outer wing sections 12 and 14. Each of these factors help contribute to the fact that long support arms or stringers running from movable frame 4 to wing sections 12 and 14 are not needed, with the absence of such stringers being both cost effective as well as simplifying the folding of tool bar assembly 2.

Various modifications of this invention will be apparent to those skilled in the art. For example, while the retraction of the wheels on outer wing section 14 has been described as happening at the beginning of the second stage of folding, such retraction could occur later in the second stage or even towards the end of the first stage of folding. The third support wheel 46 on the extreme tip of outer wing section 14 is useful but could be deleted if so desired as the major support for outer wing section 14 is provided by the two extensible and retractable wheels 32 of wheel pair 30.

The invention claimed is:

1. An agricultural tool bar assembly for mounting to a movable frame, which comprises:
    (a) a central section having opposite ends that carry pivotal wings, each wing comprising an inner pivot that pivotally joins an inner wing section to one end of the central section and an outer pivot that pivotally joins an outer wing section of the wing to the inner wing section;
    (b) the tool bar assembly having a substantially horizontal deployed position in which the central and wing sections thereof are aligned end-to-end with one another and extend laterally relative to the frame across a working width that is substantially wider than a maximum width of the frame, wherein the tool bar assembly has a plurality of agricultural tools laterally spaced apart across the working width thereof with the agricultural tools engaging the ground in the deployed position;
    (c) the tool bar assembly further having a transport/storage position in which the agricultural tools are raised out of contact with the ground, wherein each of the wings in the transport/storage position is folded lengthwise by pivoting the outer wing section substantially 180° about the outer pivot until the outer wing section at least partially overlies the inner wing section and each wing is inwardly swung to be located proximate to one side of the frame by pivoting the inner wing section substantially 90° about the inner pivot relative to the central section;
    (d) wherein the inner and outer pivots are substantially horizontal in the deployed position of the tool bar assembly with the inner and outer wing sections being independently pivotal from each other about the inner and outer pivots to permit independent ground following action of the wing sections in the deployed position;
    (e) wherein the inner and outer pivots are substantially vertical in the transport/storage position of the tool bar assembly to permit placement of the lengthwise folded and inwardly swung wings proximate to the sides of the frame; and
    (f) a tilting mount for attaching the central section to the frame, the mount being configured for tilting the central section relative to the frame about a substantially lateral and horizontal pivot axis to change the orientation of the inner and outer pivots from the substantially horizontal orientation in the deployed position to the substantially vertical orientation in the transport/storage position.

2. The tool bar assembly of claim 1, wherein the outer pivot of each wing defines a pivot axis that is laterally inclined relative to a straight fore-and-aft line such that the outer wing section when folded over the inner wing section does not fully overlie the inner wing section but is inclined or tilted relative to the inner wing section such that the folded over inner and outer wing sections have a generally V-shaped configuration with the outer pivot being located at an apex of the V-shaped configuration.

3. The tool bar assembly of claim 2, wherein the inner pivot of each wing defines a pivot axis that is aligned with a straight fore-and-aft line, wherein the pivot axis defined by the inner pivot is not completely vertical in the transport/storage position but is inclined relative to the vertical in a manner that causes the inner wing section of each wing to lift upwardly as it is swung inwardly towards the side of the frame.

4. The tool bar assembly of claim 3, wherein each wing in the transport/storage position has the inner wing section inclined upwardly from the inner pivot to the outer pivot thereof with the V-shaped configuration between the inner and outer wing sections at the outer pivot causing the outer wing section to be substantially horizontally oriented relative to the frame.

5. The tool bar assembly of claim 1, wherein each wing comprises at least one wheel that engages the ground in the deployed position with the ground engaging wheel being located proximate to the outer pivot for carrying the weight of the wing in the deployed position at an intermediate location along each wing.

6. The tool bar assembly of claim 5, wherein the ground engaging wheel is carried on the outer wing section of each wing.

7. The tool bar assembly of claim 5, wherein the ground engaging wheel is rotatably journalled on a pivot that can be extended towards and retracted away from the ground by an actuator.

8. The tool bar assembly of claim 7, wherein the actuator is a hydraulic cylinder.

9. The tool bar assembly of claim 7, wherein a pair of ground engaging wheels is journalled on the pivot.

10. The tool bar assembly of claim 5, wherein the inner and outer wing sections of each wing are supported in the deployed and transport/storage positions without any stringers extending between the wing sections and the frame.

11. The tool bar assembly of claim 5, further including an additional ground engaging wheel in contact with the ground in the deployed position which additional ground engaging wheel is located adjacent an outer tip of the outer wing section.

12. The tool bar assembly of claim 1, wherein each of the inner and outer pivots comprises:

(a) a pivot pin that is received in a split bearing or bushing with a portion of the pivot pin extending outwardly therefrom, wherein the bearing or bushing has a slit along one side thereof to be compressible in a radial direction;

(b) wherein the split bearing or bushing is long enough to extend into a pair of aligned apertures in a pair of spaced mounting ears provided on one of the inner or outer wing sections, wherein the ears are themselves partially split by slits that extend laterally along outer portions of the ears with the slits in the outer portions of the ears connecting back to one side of the apertures in the ears;

(c) a plurality of fasteners acting on the ears in the manner of a clamp to draw the ears together tightly enough that the split bearing or bushing is radially compressed or pinched sufficiently tightly such that the pivot pin will become rigid relative to the ears; and (d) an apertured mounting flange located on the other of the inner or outer wing sections with the flange being received on the outwardly extending portion of the pivot pin to pivotally journal the inner and outer wing sections together, the split bearing or bushing and pivot pin being replaceable by loosening the fasteners to release the split bearing or bushing from its tightly gripped condition within the ears.

13. An agricultural tool bar assembly, which comprises:

a central section having a pair of pivotal wings each of which comprises pivotal inner and outer wing sections, wherein the sections can be folded into a transport/storage position or unfolded into a substantially horizontal deployed position;

a plurality of agricultural tools carried on the central section and the inner and outer wing sections;

wherein the sections in the deployed position are aligned end-to-end laterally behind a rear end of a movable frame which mounts central section;

wherein, in the transport/storage position, the central section still extends laterally behind the rear end of the frame but the pivotal wings have been folded forwardly at the ends of the central section to lie along opposite sides of the movable frame; and wherein, in each folded pivotal wing, the inner wing section extends forwardly and upwardly at an angle from the central section and the outer wing section extends substantially rearwardly and horizontally from a front end of the inner wing section.

* * * * *